(12) United States Patent
Tabata et al.

(10) Patent No.: US 7,534,190 B2
(45) Date of Patent: May 19, 2009

(54) CONTROL DEVICE FOR VEHICULAR DRIVE SYSTEM

(75) Inventors: Atsushi Tabata, Okazaki (JP); Yutaka Taga, Aichi-gun (JP)

(73) Assignee: Toyota Jidosha Kabuhsiki Kaisha, Toyota-shi (JP)

(*) Notice: Subject to any disclaimer, the term of this patent is extended or adjusted under 35 U.S.C. 154(b) by 304 days.

(21) Appl. No.: 11/322,250

(22) Filed: Jan. 3, 2006

(65) Prior Publication Data

US 2008/0004156 A1 Jan. 3, 2008

(51) Int. Cl.
*B60K 1/02* (2006.01)

(52) U.S. Cl. ............ 477/3; 477/4; 477/5; 477/6; 475/5; 475/276; 180/65.7

(58) Field of Classification Search .......... None
See application file for complete search history.

(56) References Cited

U.S. PATENT DOCUMENTS

| | | | |
|---|---|---|---|
| 6,190,283 B1* | 2/2001 | Uchida | 477/5 |
| 6,401,022 B2* | 6/2002 | Kubota et al. | 701/54 |
| 6,493,626 B2* | 12/2002 | Mitani et al. | 701/103 |
| 6,726,594 B2* | 4/2004 | Mizuno et al. | 477/37 |
| 7,169,074 B2* | 1/2007 | Raghavan et al. | 475/5 |
| 7,179,186 B2* | 2/2007 | Bucknor et al. | 475/5 |
| 7,214,154 B2* | 5/2007 | Klemen et al. | 475/5 |
| 7,220,203 B2* | 5/2007 | Holmes et al. | 475/5 |
| 2007/0293362 A1* | 12/2007 | Kamada et al. | 475/5 |
| 2008/0076623 A1* | 3/2008 | Tabata et al. | 477/5 |

FOREIGN PATENT DOCUMENTS

| | | |
|---|---|---|
| JP | 9-37411 | 2/1997 |
| JP | 10-224910 | 8/1998 |
| JP | 11-217025 | 8/1999 |
| JP | 2000-2327 | 1/2000 |
| JP | 200-142146 | 5/2000 |
| JP | 2000-248974 | 9/2000 |
| JP | 2000-346187 | 12/2000 |
| JP | 2004-254468 | 9/2004 |

* cited by examiner

*Primary Examiner*—David D. Le
(74) *Attorney, Agent, or Firm*—Oblon, Spivak, McClelland, Maier & Neustadt, P.C.

(57) ABSTRACT

Upon shifting control of differential mechanism 10, speed ratio $\gamma 0$ of continuously-variable transmission portion 11 and speed ratio $\gamma$ of automatic transmission portion 20 are determined by vehicle-output control device 82 on the basis of target engine output $P_E^*$ and vehicle speed V, so as to establish an operating point of engine 8 which provides the target engine output $P_E^*$ and which follows an optimum-fuel-economy curve, and the shifting control of the continuously-variable transmission portion 11 and the shifting control of the automatic transmission portion 20 are effected substantially concurrently, so that engine speed $N_E$ continuously changes, and the differential mechanism 10 is shifted with a reduced shifting shock. Further, the speed ratio $\gamma 0$ of the continuously-variable transmission portion 11, in other words, the engine speed $N_E$ is changed by using first electric motor M1 and/or second electric motor M2, permitting an improvement in shifting response of the differential mechanism 10.

24 Claims, 18 Drawing Sheets

| | C0 | C1 | C2 | B0 | B1 | B2 | B3 | SPEED RATIO | STEPPING RATIO |
|---|---|---|---|---|---|---|---|---|---|
| 1st | ◎ | ○ | | | | | ○ | 3.357 | 1.54 |
| 2nd | ◎ | ○ | | | | ○ | | 2.180 | 1.53 |
| 3rd | ◎ | ○ | | | ○ | | | 1.424 | 1.42 |
| 4th | ◎ | ○ | ○ | | | | | 1.000 | 1.42 |
| 5th | | ○ | ○ | ◎ | | | | 0.705 | SPREAD 4.76 |
| R | | | ○ | | | | ○ | 3.209 | |
| N | ○ | | | | | | | | |

○ ENGAGED
◎ ENGAGED FOR STEP-VARIABLE SHIFTING, AND RELEASED FOR CONTINUOUSLY-VARIABLE SHIFTING

| | C0 | C1 | C2 | B0 | B1 | B2 | SPEED RATIO | STEPPING RATIO |
|---|---|---|---|---|---|---|---|---|
| 1st | ◎ | ○ | | | | ○ | 2.804 | 1.54 |
| 2nd | ◎ | ○ | | | ○ | | 1.531 | 1.53 |
| 3rd | ◎ | ○ | ○ | | | | 1.000 | 1.42 |
| 4th | | ○ | ○ | ◎ | | | 0.705 | SPREAD 3.977 |
| R | | | ○ | | | ○ | 2.393 | |
| N | ○ | | | | | | | |

○ ENGAGED
◎ ENGAGED FOR STEP-VARIABLE SHIFTING, AND RELEASED FOR CONTINUOUSLY-VARIABLE SHIFTING

CONTROL DEVICE FOR VEHICULAR DRIVE SYSTEM

BACKGROUND OF THE INVENTION

1. Field of the Invention

The present invention relates to a control device for a vehicular drive system, and more particularly to techniques for permitting an adequate shifting control of a vehicular drive system which includes a differential mechanism operable functioning as an electrically controlled differential device having a differential function, and an automatic transmission constituting a part of a power transmitting path between the differential mechanism and drive wheels of a vehicle.

2. Discussion of Related Art

There is known a vehicular drive system including a differential mechanism operable to distribute an output of an engine to a first electric motor and an output shaft, and a second electric motor disposed between an output shaft of the differential mechanism and the drive wheels. Examples of this type of vehicular drive system include a drive system for a hybrid vehicle as disclosed in Patent Document 1. In this hybrid vehicle drive systems, the differential mechanism is constituted by a planetary gear set, for example, and a major portion of a drive force of the engine is mechanically transmitted to the drive wheels through a differential function of the differential mechanism, while the remaining portion of the drive force of the engine is electrically transmitted to the second electric motor through an electric path between the first electric motor and the second electric motor. Thus, the differential mechanism can function as a transmission the speed ratio of which is electrically variable, for instance, as an electrically controlled continuously variable transmission. The vehicular drive system is controlled by a control device such that the engine is operated with the highest operating efficiency, to drive the vehicle with improved fuel economy. The vehicular drive system of Patent Document 1 further includes a step-variable automatic transmission disposed in the power transmitting path between the output shaft of the differential mechanism and the drive wheels, so that the second electric motor can be small-sized.

[Patent Document 1] JP-2000-2327A
[Patent Document 2] JP-2000-346187A

In a vehicular drive system including an automatic transmission provided with a fluid-operated power transmitting device such as a torque converter, on the other hand, the engine speed is generally raised owing to a slipping motion within the torque converter, and the shifting of the automatic transmission is controlled such that the engine speed coincides with a speed of synchronization after completion of a shift-down action of the automatic transmission.

However, the vehicular drive system as disclosed in Patent Document 1 wherein the fluid-operated power transmitting device such as a torque converter is not provided, suffers from a possibility of inadequate shifting control due to inadequate control of the engine speed caused by inadequate timings of shifting control of the differential mechanism and shifting control of the automatic transmission.

SUMMARY OF THE INVENTION

The present invention was made in view of the background art described above. It is therefore an object of the present invention to provide a control device for a vehicular drive system including a differential mechanism functioning as an electrically controlled differential device having a differential function, and an automatic transmission constituting a part of a power transmitting path between the differential mechanism and drive wheels of a vehicle, and which permits adequate shifting control of the vehicular drive system.

Namely, the present invention defined in claim 1 provides a control device for a vehicular drive system including a continuously-variable transmission portion operable as an electrically controlled continuously variable transmission and having a differential mechanism operable to distribute an output of an engine to a first electric motor and a power transmitting member, and a second electric motor disposed in a power transmitting path between the power transmitting member and a drive wheel of a vehicle, and further including an automatic transmission portion which constitutes a part of the power transmitting path and which functions as an automatic transmission, the control device being characterized by comprising vehicle-output control means for determining a speed ratio of the continuously-variable transmission portion and a speed ratio of the automatic transmission portion, on the basis of a target output of the vehicle and a running speed of the vehicle, so as to establish an operating point of the engine which provides a target output of the engine.

In the above-described control device for a vehicular drive system including a continuously-variable transmission portion operable as an electrically controlled continuously variable transmission and an automatic transmission portion functioning as an automatic transmission, the vehicle-output control means determines the speed ratio of the continuously-variable transmission portion and the speed ratio of the automatic transmission portion on the basis of the target output of the vehicle and the running speed of the vehicle, so as to establish an operating point of the engine which provides the target output of the engine. Accordingly, the shifting control of the continuously-variable transmission portion and the shifting control of the automatic transmission portion can be adequately performed during the shifting control of the drive system, so as to adequately control the operating point of the engine, that is, so as to adequately control the engine output determined by the engine speed and torque.

The present invention defined in claim 2 provides a control device for a vehicular drive system including a continuously-variable transmission portion operable as an electrically controlled continuously variable transmission and having a differential mechanism operable to distribute an output of an engine to a first electric motor and a power transmitting member, and a second electric motor disposed in a power transmitting path between the power transmitting member and a drive wheel of a vehicle, and further including an automatic transmission portion which constitutes a part of the power transmitting path and which functions as an automatic transmission, the control device being characterized by comprising vehicle-output control means for determining a speed ratio of the continuously-variable transmission portion and a speed ratio of the automatic transmission portion, on the basis of a target output of the engine and a running speed of the vehicle, so as to establish an operating point of the engine which provides the target output of the engine.

In the above-described control device for a vehicular drive system including a continuously-variable transmission portion operable as an electrically controlled continuously variable transmission and an automatic transmission portion functioning as an automatic transmission, the vehicle-output control means determines the speed ratio of the continuously-variable transmission portion and the speed ratio of the automatic transmission portion on the basis of the target output of the engine and the running speed of the vehicle, so as to establish an operating point of the engine which provides the target output of the engine. Accordingly, the shifting control of the continuously-variable transmission portion and the shifting control of the automatic transmission portion can be adequately performed during the shifting control of the drive system, so as to adequately control the operating point of the engine, that is, so as to adequately control the engine output determined by the engine speed and torque.

The present invention defined in claim 3 provides a control device for a vehicular drive system including a continuously-variable transmission portion operable as an electrically controlled continuously variable transmission and having a differential mechanism operable to distribute an output of an engine to a first electric motor and a power transmitting member, and a second electric motor disposed in a power transmitting path between the power transmitting member and a drive wheel of a vehicle, and further including an automatic transmission portion which constitutes a part of the power transmitting path and which functions as an automatic transmission, the control device being characterized by comprising vehicle-output control means for determining a speed ratio of the continuously-variable transmission portion and a speed ratio of the automatic transmission portion, on the basis of an output of the vehicle required by an operator of the vehicle and a running speed of the vehicle, so as to establish an operating point of the engine which provides a target output of the engine.

In the above-described control device for a vehicular drive system including a continuously-variable transmission portion operable as an electrically controlled continuously variable transmission and an automatic transmission portion functioning as an automatic transmission, the vehicle-output control means determines the speed ratio of the continuously-variable transmission portion and the speed ratio of the automatic transmission portion on the basis of the output of the vehicle required by the vehicle operator and the running speed of the vehicle, so as to establish an operating point of the engine which provides the target output of the engine. Accordingly, the shifting control of the continuously-variable transmission portion and the shifting control of the automatic transmission portion can be adequately performed during the shifting control of the drive system, so as to adequately control the operating point of the engine, that is, so as to adequately control the engine output determined by the engine speed and torque.

According to the present invention defined in claim 4, the control device further comprises target-output calculating means for calculating a target output of the vehicle on the basis of an output of the vehicle required by an operator of the vehicle and according to a stored relationship, and target-engine-output calculating means for calculating the target output of the engine on the basis of the target output of the vehicle, and wherein the vehicle-output control means determines the speed ratio of the continuously-variable transmission portion and the speed ratio of the automatic transmission portion on the basis of the target output of the engine and the running speed of the vehicle, so as to establish the operating point of the engine which provides the target output of the engine and which is located close to a stored optimum fuel-economy curve of the engine. In this case, the shifting control of the continuously-variable transmission portion and the shifting control of the automatic transmission portion can be adequately performed during the shifting control of the drive system.

According to the present invention defined in claim 5, a shifting control of said continuously-variable transmission portion and a shifting control of said automatic transmission portion are effected substantially concurrently, on the basis of the speed ratio of the continuously-variable transmission portion and the speed ratio of the automatic transmission portion which have been determined by the vehicle-output control means. In this case, the engine speed is continuously changed, so that the shifting shock is reduced.

According to the present invention defined in claim 6, the speed ratio of the continuously-variable transmission portion determined by the vehicle-output control means is established by using the first electric motor and/or the second electric motor. In this case, the shifting response is improved owing to a change of the engine speed by the first electric motor and/or the second electric motor.

Preferably, the differential mechanism includes a differential-state switching device operable to place the differential mechanism selectively into a continuously-variable shifting state in which the continuously-variable transmission portion is operable as an electrically controlled continuously variable transmission, and a step-variable shifting state in which the continuously-variable transmission portion is not operable as the electrically controlled transmission. In this arrangement, the continuously-variable transmission portion can be easily switched between the continuously-variable shifting state and the step-variable shifting state. In this case, the vehicle-output control means determines the speed ratio of the continuously-variable transmission portion and the speed ratio of the automatic transmission portion, in different methods depending upon whether the continuously-variable transmission portion is placed in the continuously-variable shifting state or the step-variable shifting state. In the step-variable shifting state in which the speed ratio of the continuously-variable transmission portion is held constant and the engine speed is bound by the vehicle speed, the engine-output control means determines the speed ratio of the continuously-variable transmission portion and the speed ratio of the automatic transmission portion, so as to establish the operating point of the engine which provides the target engine output and which is located relatively close to the stored optimum fuel-economy curve. In the continuously-variable shifting state in which the speed ratio of the continuously-variable transmission portion is changed by the first electric motor and/or the second electric motor, that is, the engine is in a freely rotatable state in which the engine speed is not bound by the vehicle speed, the vehicle-output control means determines the speed ratio of the continuously-variable transmission portion and the speed ratio of the automatic transmission portion, so as to establish the operating point of the engine which provides the target engine output and which follows the stored optimum fuel-economy curve.

Preferably, the differential mechanism includes a first element fixed to the engine, a second element fixed to the fist electric motor, and a third element fixed to the power distributing member, and the above-indicated differential-state switching device is operable to permit the first, second and third elements to be rotated relative to each other, for thereby placing the differential mechanism in the continuously-variable shifting state, and to connect the first, second and third elements for rotation as a unit or to hold the second element stationary, for thereby placing the differential mechanism in the step-variable shifting state. In this arrangement, the continuously-variable transmission portion can be easily switched between a continuously-variable shifting state and a step-variable shifting state.

Preferably, the differential-state switching device includes a clutch operable to connect at least two of the first, second and third elements to each other for rotation of the first, second and third elements as a unit, and/or a brake operable to fix the second element to a stationary member for holding the second element stationary. In this arrangement, the continuously-variable transmission portion can be easily switched between a continuously-variable shifting state and a step-variable shifting state.

BRIEF DESCRIPTION OF THE DRAWINGS

The above and other objects, features, advantages and industrial significance of the present invention will be better understood by reading the following detailed description of preferred embodiments of this invention, when taken in connection with the accompanying drawings, in which.

DETAILED DESCRIPTION OF THE PREFERRED EMBODIMENTS

Embodiment 1

Figures 1, 2:
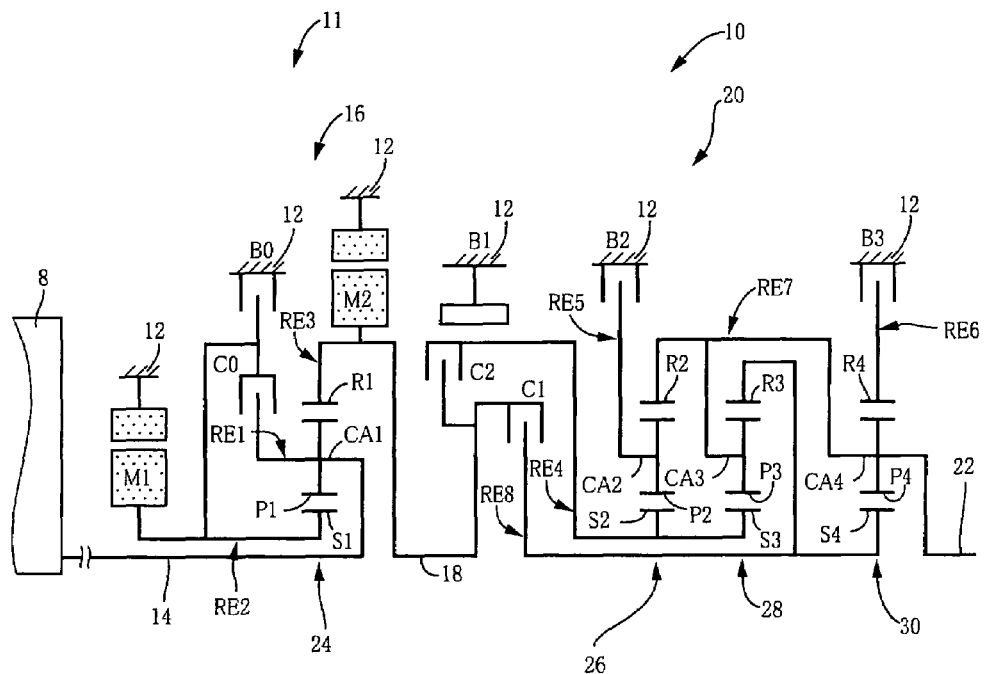
FIG. 1 is a schematic view showing an arrangement of a drive system for a hybrid vehicle, which is constructed according to one embodiment of the present invention.
FIG. 2 is a table indicating shifting actions of the hybrid vehicle drive system of the embodiment of FIG. 1, which is operable in a selected one of a continuously-variable shifting state and a step-variable shifting state, in relation to different combinations of operating states of hydraulically operated frictional coupling devices to effect the respective shifting actions.
Figure 5:
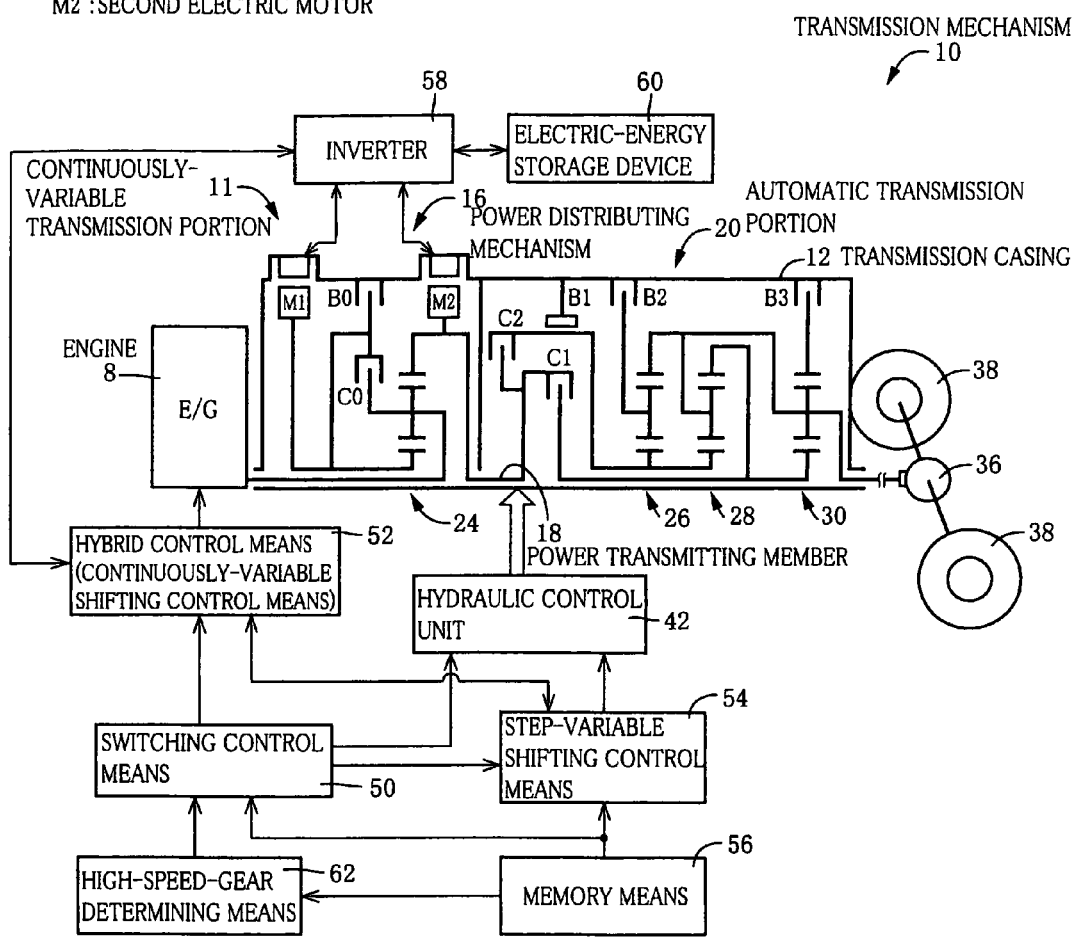
FIG. 5 is a functional block diagram illustrating major control functions of the electronic control device of FIG. 4.

Referring to the schematic view of FIG. 1, there is sown a drive mechanism 10 constituting a part of a drive system for a hybrid vehicle, which drive system is controlled by a control device according to one embodiment of this invention. As shown in FIG. 1, the transmission mechanism 10 includes an input rotary member in the form of an input shaft 14, a power transmitting device in the form of a continuously-variable transmission portion 11, a step-variable automatic transmission in the form of an automatic transmission portion 20, and an output rotary member in the form of an output shaft 22, which are disposed on a common axis in a transmission casing 12 functioning as a stationary member attached to a body of the vehicle. The continuously-variable transmission portion 11 is connected to the input shaft 14 either directly, or indirectly via a pulsation absorbing damper (vibration damping device) not shown. The automatic transmission portion 20 is interposed in a power transmitting path between the continuously-variable transmission portion 11 and drive wheels 38, and is connected in series to the continuously-variable transmission portion 11 via a power transmitting member 18 (power transmitting shaft). The output shaft 22 is connected to the automatic transmission portion 20. This transmission mechanism 10 is suitably used for a transverse FR vehicle (front-engine, rear-drive vehicle), and is disposed between a drive power source in the form of an internal combustion engine 8 and the pair of drive wheels 38, to transmit a vehicle drive force from the engine 8 to the pair of drive wheels 38 through a differential gear device 36 (final speed-reduction device) and a pair of drive axles, as shown in FIG. 5. The differential gear device 36 constitutes a part of the other power transmitting path of the drive system. The engine 8 may be a gasoline engine or diesel engine and functions as a vehicle drive power source directly connected to the input shaft 14 or indirectly via the pulsation absorbing damper not shown. It is noted that the transmission mechanism 10 is constructed symmetrically with respect to its axis, and that the lower half of the transmission mechanism is not shown in the schematic view of FIG. 1. This is also true to the other embodiments of this invention which will be described. In the present transmission mechanism 10, the engine 8 and the continuously-variable transmission portion 11 are connected to each other directly or indirectly through the pulsation absorbing damper, as described above, but a fluid-operated power transmitting device such as a torque converter or fluid coupling is not interposed between the engine 8 and the transmission portion 11.

The continuously-variable transmission portion 11 includes: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 the output shaft of which is rotated with the power transmitting member 18. The second electric motor M2 may be disposed at any portion of the power transmitting path between the power transmitting member 18 and the drive wheels 38. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as major components, a first planetary gear set 24 of a single pinion type having a gear ratio $\rho1$ of about 0.418, for example, a switching clutch C0 and a switching brake B1. The first planetary gear set 24 has rotary elements consisting of: a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio $\rho1$ is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The switching brake B0 is disposed between the first sun gear S1 and the transmission casing 12, and the switching clutch C0 is disposed between the first sun gear S1 and the first carrier CA1. When the switching clutch C0 and brake B0 are both released, the power distributing mechanism 16 is placed in a differential state in which the first sun gear S1, first carrier CA1 and first ring gear R1 of the first planetary gear set 24 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the power distributing mechanism 16 is placed in a continuously-variable shifting state (electrically established CVT state), in which the rotating speed of the power transmitting member 18 is continuously variable, irrespective of the rotating speed of the engine 8, namely, placed in the differential state in which a speed ratio $\gamma0$ (rotating speed of the input shaft 14/rotating speed of the power transmitting member 18) of the power distributing mechanism 16 is continuously changed from a minimum value $\gamma0$ min to a maximum value $\gamma0$ max, that is, in the continuously-variable shifting state in which the power distributing mechanism 16 functions as an electrically controlled continuously variable transmission the speed ratio $\gamma0$ of which is continuously variable from the minimum value $\gamma0$ min to the maximum value $\gamma0$ max.

When the switching clutch C0 or brake B0 is engaged while the power distributing mechanism 16 is placed in the continuously-variable shifting state, the mechanism 16 is brought into a non-differential state in which the differential function is not available. Described in detail, when the switching clutch C0 is engaged, the first sun gear S1 and the first carrier CA1 are connected together, so that the power distributing mechanism 16 is placed in a locked state or the non-differential state in which the three rotary elements of the first planetary gear set 24 consisting of the first sun gear S1, first carrier CA1 and first ring gear R1 are rotatable as a unit, so that the continuously-variable transmission portion 11 is also placed in the non-differential state. In this non-differential state, the rotating speed of the engine 8 and the rotating speed of the power transmitting member 18 are made equal to each other, so that the power distributing mechanism 16 is placed in a fixed-speed-ratio shifting state or step-variable shifting state in which the mechanism 16 functions as a transmission having a fixed speed ratio $\gamma0$ equal to 1. When the switching brake B0 is engaged in place of the switching clutch C0, the first sun gear S1 is fixed to the transmission casing 12, so that the power distributing mechanism 16 is placed in the locked or non-differential state in which the first sun gear S1 is not rotatable. Since the rotating speed of the first ring gear R1 is made higher than that of the first carrier CA1, the continuously-variable transmission portion 11 is placed in the fixed-speed-ratio shifting state or step-variable shifting state in which the mechanism 16 functions as a speed-increasing transmission having a fixed speed ratio $\gamma0$ smaller than 1, for example, about 0.7. Thus, the frictional coupling devices in the form of the switching clutch C0 and brake B0 function as a differential-state switching device operable to selectively place the continuously-variable transmission portion 11 (power distributing mechanism 16) selectively in the differential state and the non-differential state, that is, in the continuously-variable shifting state (differential state) in which the continuously-variable transmission portion 11 (power distributing mechanism 16) is operable as an electrically controlled continuously variable transmission, for example, as a continuously variable transmission the speed ratio of which is continuously variable, and in the locked state in which the continuously-variable transmission portion 11 is not operable as the continuously variable transmission but functions as a transmission the speed ratio of which is kept unchanged, that is, in the fixed-speed-ratio shifting state (non-differential state) in which the continuously-variable transmission portion 11 is not operable as the electrically controlled continuously variable transmission, but functions as a transmission having a single gear position with one speed ratio or a plurality of gear positions with respective to or more speed ratios, namely, in the fixed-speed-ratio shifting state in which the continuously-variable transmission portion 11 functions as a transmission having one gear position or a plurality of gear positions having fixed speed ratio or ratios.

The automatic transmission portion 20 includes a single-pinion type second planetary gear set 26, a single-pinion type third planetary gear set 28 and a single-pinion type fourth planetary gear set 30. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio ρ2 of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio ρ3 of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio ρ4 of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios ρ2, ρ3 and ρ4 are represented by ZS2/ZR2. ZS3/ZR3, and ZS4/ZR4, respectively.

In the automatic transmission portion 20, the second sun gear S2 and the third sun gear S3 are integrally fixed to each other as a unit, selectively connected to the power transmitting member 18 through a second clutch C2, and selectively fixed to the transmission casing 12 through a first brake B1. The second carrier CA2 is selectively fixed to the transmission casing 12 through a second brake B2, and the fourth ring gear R4 is selectively fixed to the transmission casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1. Thus, the automatic transmission portion 20 and the power transmitting member 18 are selectively connected to each other through the first clutch C1 or second clutch C2, which is used to establish gear positions of the automatic transmission portion 20. In other words, the first and second clutches C1, C2 cooperate to function as coupling devices operable to switch a power transmitting path connecting the power transmitting member 18 and the automatic transmission portion 20 (connecting the continuously-variable transmission portion 11 (power transmitting member 18) and the drive wheels 38), between a power-transmitting state in which a vehicle drive force can be transmitted through the power transmitting path, and a power-cutoff state in which the vehicle drive force cannot be transmitted through the power transmitting path. That is, the power transmitting path is placed in the power-transmitting state when at least one of the first and second clutches C1, C2 is engaged, and is placed in the power-cutoff state when the first and second clutches C1, C2 are both released.

The above-described switching clutch C0, first clutch C1, second clutch C2, switching brake B0, first brake B1, second brake B2 and third brake B3 are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

In the transmission mechanism 10 constructed as described above, one of a first gear position (first speed position) through a fifth gear position (fifth speed position), a reverse gear position (rear drive position) and a neural position is selectively established by engaging actions of a corresponding combination of the frictional coupling devices selected from the above-described switching clutch C0, first clutch C1, second clutch C2, switching brake B0, first brake B1, second brake B2 and third brake B3, as indicated in the table of FIG. 2. Those positions have respective speed ratios γ (input shaft speed $N_{IN}$/output shaft speed $N_{OUT}$) which change as geometric series. In particular, it is noted that the power distributing mechanism 16 is provided with the switching clutch C0 and brake B0 so that the continuously-variable transmission portion 11 can be selectively placed by engagement of the switching clutch C0 or switching brake B0, in the fixed-speed-ratio shifting state in which the continuously-variable transmission portion 11 is operable as a transmission having a single gear position with one speed ratio or a plurality of gear positions with respective speed ratios, as well as in the continuously-variable shifting state in which the continuously-variable transmission portion 11 is operable as a continuously variable transmission, as described above. In the present transmission mechanism 10, therefore, a step-variable transmission is constituted by the automatic transmission portion 20, and the continuously-variable transmission portion 11 which is placed in the fixed-speed-ratio shifting state by engagement of the switching clutch C0 or switching brake B0. Further, a continuously variable transmission is constituted by the automatic transmission portion 20, and the continuously-variable transmission portion 11 which is placed in the continuously-variable shifting state, with none of the switching clutch C0 and brake B0 being engaged. In other words, the transmission mechanism 10 is switched to the step-variable shifting state by engaging one of the switching clutch C0 and switching brake B0, and switched to the continuously-variable shifting state by releasing both of the switching clutch C0 and brake B0. The continuously-variable transmission portion 11 is also considered to be a transmission switchable between the step-variable shifting state and the continuously-variable shifting state.

Where the transmission mechanism 10 functions as the step-variable transmission, for example, the first gear position having the highest speed ratio γ1 of about 3.357, for example, is established by engaging actions of the switching clutch C0, first clutch C1 and third brake B3, and the second gear position having the speed ratio γ2 of about 2.180, for example, which is lower than the speed ratio γ1, is established by engaging actions of the switching clutch C0, first clutch C1 and second brake B2, as indicated in FIG. 2. Further, the third gear position having the speed ratio γ3 of about 1.424, for example, which is lower than the speed ratio γ2, is established by engaging actions of the switching clutch C0, first clutch C1 and first brake B1, and the fourth gear position having the speed ratio γ4 of about 1.000, for example, which is lower than the speed ratio γ3, is established by engaging actions of the switching clutch C0, first clutch C1 and second clutch C2. The fifth gear position having the speed ratio γ5 of about 0.705, for example, which is smaller than the speed ratio γ4, is established by engaging actions of the first clutch C1, second clutch C2 and switching brake B0. Further, the reverse gear position having the speed ratio γR of about 3.209, for example, which is intermediate between the speed ratios γ1 and γ2, is established by engaging actions of the second clutch C2 and the third brake B3. The neutral position N is established by engaging only the switching clutch C0.

Where the transmission mechanism 10 functions as the continuously-variable transmission, on the other hand, the switching clutch C0 and the switching brake B0 indicated in FIG. 2 are both released, so that the continuously-variable transmission portion 11 functions as the continuously variable transmission, while the automatic transmission portion 20 connected in series to the continuously-variable transmission portion 11 functions as the step-variable transmission, whereby the speed of the rotary motion transmitted to the automatic transmission portion 20 placed in one of the first through fourth gear positions, namely, the rotating speed of the power transmitting member 18 is continuously changed, so that the speed ratio of the drive system when the automatic transmission portion 20 is placed in one of those gear positions is continuously variable over a predetermined range. Accordingly, the speed ratio of the automatic transmission portion 20 is continuously variable across the adjacent gear positions, whereby the overall speed ratio γT of the transmission mechanism 10 is continuously variable.

Figure 3:
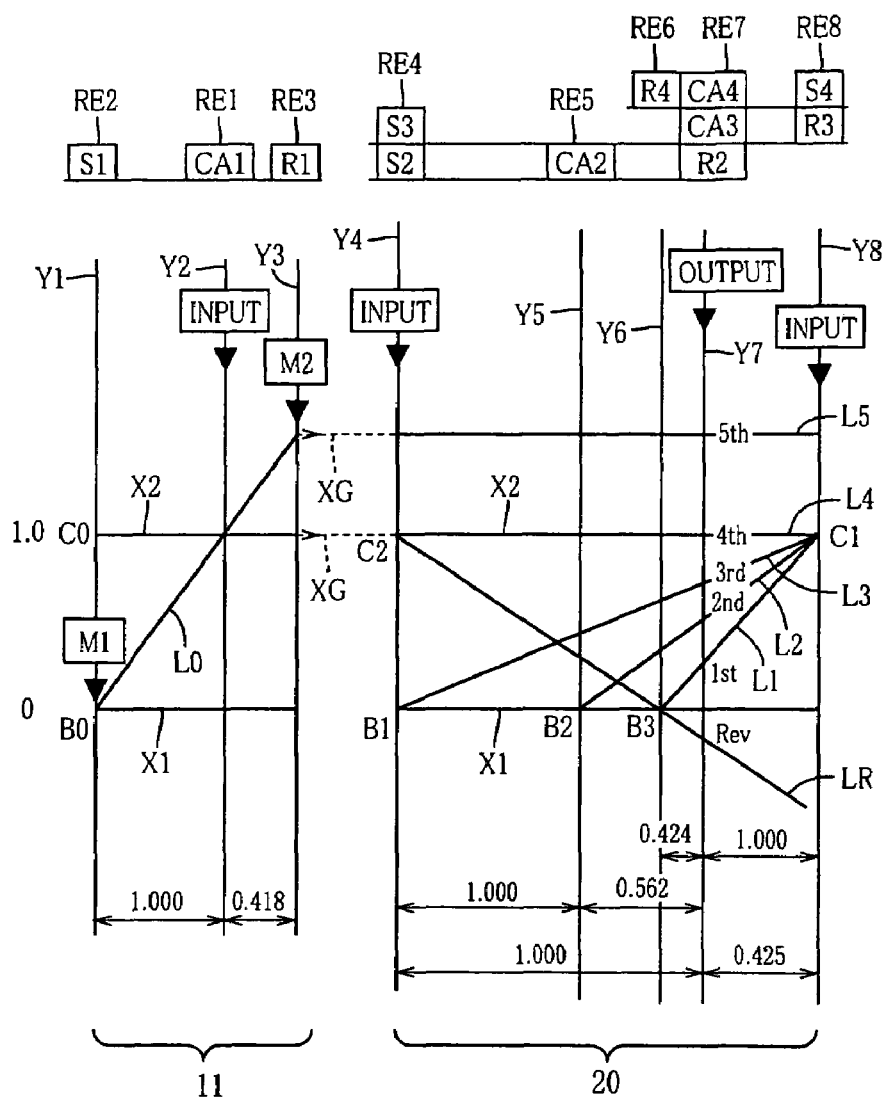
FIG. 3 is a collinear chart indicating relative rotating speeds of rotary elements of the drive system of the hybrid vehicle drive system of the embodiment of FIG. 1 operated in the step-variable shifting state, in different gear positions of the drive system.

The collinear chart of FIG. 3 indicates, by straight lines, a relationship among the rotating speeds of the rotary elements in each of the gear positions of the transmission mechanism 10, which is constituted by the continuously-variable transmission portion 11 functioning as the continuously-variable shifting portion or first shifting portion, and the automatic transmission portion 20 functioning as the step-variable shifting portion or second shifting portion. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. A lower one of three horizontal lines X1, X2, XG, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 which are arranged in the right direction and which correspond to the continuously-variable transmission portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the automatic transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines Y4-Y8 are determined by the gear ratios ρ2, ρ3 and ρ4 of the second, third and fourth planetary gear sets 26, 28, 30. That is, the distances between the sun gear and carrier of each of the second, third and fourth planetary gear sets 26, 28, corresponds to "1", while the distances between the carrier and ring gear of each of those planetary gear sets 26 28, 30 corresponds to the gear ratio ρ. In the automatic transmission portion 20, the distance between the sun gear and carrier of each of the second, third and fourth planetary gear sets 26, 28, corresponds to "1", while the distance between the carrier and the ring gear corresponds to the gear ratio ρ.

Referring to the collinear chart of FIG. 3, the power distributing mechanism 16 (continuously-variable transmission portion 11) of the transmission mechanism 10 is arranged such that the first rotary element RE1 (first carrier CA1) of the first planetary gear set 24 is integrally fixed to the input shaft 14 (engine 8) and selectively connected to the second rotary element RE2 (first sun gear S1) through the switching clutch C0, and this second rotary element RE2 is fixed to the first electric motor M1 and selectively fixed to the transmission casing 12 through the switching brake B0, while the third rotary element RE3 (first ring gear R1) is fixed to the power transmitting member 18 and the second electric motor M2, so that a rotary motion of the input shaft 14 is transmitted to the automatic transmission 20 (step-variable transmission portion) through the power transmitting member 18. A relationship between the rotating speeds of the first sun gear S1 and the first ring gear R1 is represented by an inclined straight line L0 which passes a point of intersection between the lines Y2 and X2.

When the transmission mechanism 10 is brought into the continuously-variable shifting state by releasing actions of the switching clutch C0 and brake B0, for instance, the rotating speed of the first sun gear S1 represented by a point of intersection between the line L0 and the vertical line Y1 is raised or lowered by controlling the reaction force generated by an operation of the first electric motor M1 to generate an electric energy, so that the rotating speed of the first ring gear R1 represented by a point of intersection between the line L0 and the vertical line Y3 is lowered or raised. When the switching clutch C0 is engaged, the first sun gear S1 and the first carrier CA1 are connected to each other, and the power distributing mechanism 16 is placed in the non-differential state in which the above-indicated three rotary elements are rotated as a unit, so that the line L0 is aligned with the horizontal line X2, so that the power transmitting member 18 is rotated at a speed equal to the engine speed $N_E$. When the switching brake B0 is engaged, on the other hand, the rotation of the first sun gear S1 is stopped, and the power distributing mechanism 16 is placed in the non-differential state and functions as the speed-increasing mechanism, so that the line L0 is inclined in the state indicated in FIG. 3, whereby the rotating speed of the first ring gear R1, that is, the rotation of the power transmitting member 18 represented by a point of intersection between the lines L0 and Y3 is made higher than the engine speed $N_E$ and transmitted to the automatic transmission portion 20.

In the automatic transmission portion 20, the fourth rotary element RE4 is selectively connected to the power transmitting member 18 through the second clutch C2, and selectively fixed to the transmission casing 12 through the first brake B1, and the fifth rotary element RE5 is selectively fixed to the transmission casing 12 through the second brake B2, while the sixth rotary element RE6 is selectively fixed to the transmission casing 12 through the third brake B3. The seventh rotary element RE7 is fixed to the output shaft 22, while the eighth rotary element RE8 is selectively connected to the power transmitting member 18 through the first clutch C1.

When the first clutch C1 and the third brake B3 are engaged, the automatic transmission portion 20 is placed in the first gear position. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as shown in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22. In the first through fourth gear positions in which the switching clutch C0 is placed in the engaged state, the eighth rotary element RE8 is rotated at the same speed as the engine speed $N_E$, with the drive force received from the power distributing mechanism 16. When the switching clutch B0 is engaged in place of the switching clutch C0, on the other hand, the eighth rotary element RE8 is rotated at a speed higher than the engine speed $N_E$, with the drive force received from the power distributing mechanism 16. The rotating speed of the output shaft 22 in the fifth gear position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22.

Figure 4:
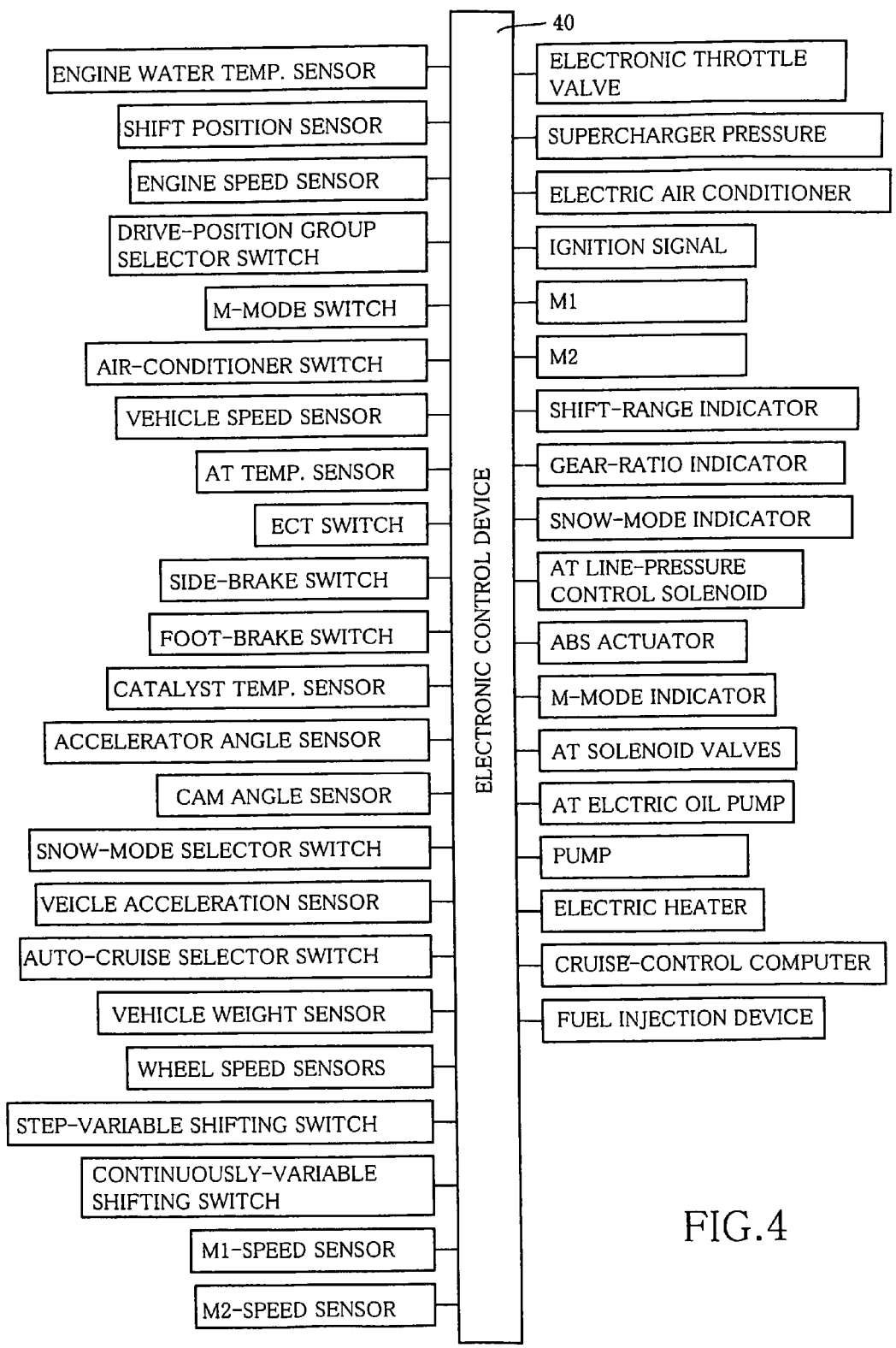
FIG. 4 is a view indicating input and output signals of an electronic control device provided in the drive system of the embodiment of FIG. 1.

FIG. 4 illustrates signals received by an electronic control device 40 provided to control the transmission mechanism 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as shifting controls of the automatic transmission portion 20.

The electronic control device 40 is arranged to receive, from various sensors and switches shown in FIG. 4, various signals such as: a signal indicative of a temperature TEMPw of cooling water of the engine; a signal indicative of a presently selected operating position $P_{SH}$ of a shift lever; a signal indicative of the operating speed $N_E$ of the engine 8; a signal indicative of a value indicating a selected group of forward-drive positions of the transmission mechanism; a signal indicative of an M mode (motor drive mode); a signal indicative of an operated state of an air conditioner; a signal indicative of a vehicle speed V corresponding to the rotating speed $N_{OUT}$ of the output shaft 22; a signal indicative of a temperature of a working oil of the automatic transmission portion 20; a signal indicative of an operated state of a side brake; a signal indicative of an operated state of a foot brake; a signal indicative of a temperature of a catalyst; a signal indicative of an operating amount $A_{CC}$ of an accelerator pedal; a signal indicative of an angle of a cam; a signal indicative of the selection of a snow drive mode; a signal indicative of a longitudinal acceleration value of the vehicle; a signal indicative of the selection of an auto-cruising drive mode; a signal indicative of a weight of the vehicle; signals indicative of speeds of the drive wheels of the vehicle; a signal indicative of an operating state of a step-variable shifting switch provided to place the continuously-variable transmission portion 11 (power distributing mechanism 16) in the fixed-speed-ratio shifting state in which the transmission mechanism 10 functions as a step-variable transmission; a signal indicative of a continuously-variable shifting switch provided to place the continuously-variable transmission portion 11 (power distributing mechanism 16) in the continuously variable-shifting state in which the transmission mechanism 10 functions as the continuously variable transmission; a signal indicative of a rotating speed $N_{M1}$ of the first electric motor M1 (hereinafter referred to as "first electric motor speed $N_{M1}$"); a signal indicative of a rotating speed $N_{M2}$ of the second electric motor M2 (hereinafter referred to as "second electric motor speed $N_{M2}$"); and a signal indicative of an intake air quantity.

The electronic control device 40 is further arranged to generate various control signals to be applied to an engine-output control device 43 (shown in FIG. 10), to control the engine output, such as: a signal to drive a throttle actuator for controlling an opening angle $\theta_{TH}$ of opening of an electronic throttle valve; a signal to control a fuel injection device for controlling an amount of injection of a fuel into the into the engine 8; a signal to control an ignition device for controlling a timing of ignition of the engine 8; a signal to adjust a pressure of a supercharger; a signal to operate the electric air conditioner; signals to operate the electric motors M1 and M2; a signal to operate a shift-range indicator for indicating the selected operating position of the shift lever; a signal to operate a gear-ratio indicator for indicating the gear ratio; a signal to operate a snow-mode indicator for indicating the selection of the snow drive mode; a signal to operate an M-mode indicator for indicating the selection of the M-mode; signals to operate solenoid-operated valves incorporated in a hydraulic control unit 42 provided to control the hydraulic actuators of the hydraulically operated frictional coupling devices of the continuously-variable transmission portion 11 and the automatic transmission portion 20; a signal to operate an electric oil pump used as a hydraulic pressure source for the hydraulic control unit 42; a signal to drive an electric heater; and a signal to be applied to a cruise-control computer.

Reference is now made to the functional block diagram of FIG. 5 for explaining major control functions of the electronic control device 40. Step-variable shifting control means 54 shown in FIG. 5 is arranged to determine whether a shifting action of the transmission mechanism 10 should take place. This determination is made on the basis of a detected state of the vehicle in the form of the detected vehicle speed V and a detected output torque $T_{OUT}$ of the automatic transmission portion 20, and according to a shifting boundary line map (shifting control map) which is stored in memory means 56 and is represented by solid lines and one-dot chain lines in FIG. 6. The step-variable shifting control means 54 commands the hydraulic control unit 42 to selectively engage and release the hydraulically operated frictional coupling devices except the switching clutch C0 and brake B0, for establishing the determined gear position according to the table of FIG. 2.

Hybrid control means 52 is arranged to control the engine 8 to be operated with high efficiency in the above-described continuously-variable shifting state of the transmission mechanism 10, that is, in the differential state of the continuously-variable transmission portion 11, and to optimize a proportion of drive forces generated by the engine 8 and the second electric motor M2, and a reaction force generated by the first electric motor M1 during its operation as the electric generator, for thereby controlling the speed ratio γ0 of the continuously-variable transmission portion 11 operating as the electrically controlled continuously variable transmission. For instance, the hybrid control means 52 calculates the output as required by the vehicle operator at the present running speed of the vehicle, on the basis of the operating amount $A_{CC}$ of the accelerator pedal and the vehicle running speed V, and calculate a required total vehicle output on the basis of the calculated required output and a required amount of generation of an electric energy by the electric motor. The hybrid control means 52 calculates a desired engine output, so as to obtain the calculated required total vehicle output, while taking into account of a loss of power transmission, load acting on devices optionally provided, and an assisting torque generated by the second electric motor M2. The hybrid control means 52 controls the engine 8 and the amount of generation of electric energy by the first electric motor M1, so as to establish the engine speed $N_E$ and torque $T_E$ at which the desired engine output is obtained. In other words, the hybrid control means 52 is able to control the engine speed $N_E$ for a given value of the vehicle running speed V and for a given speed ratio of the automatic transmission portion 20, that is, for a given speed of the power transmitting member 18, by controlling the amount of generation of the electric energy by the first electric motor M1.

The hybrid control means 52 is arranged to effect the above-described hybrid control while taking account of the presently selected gear position of the automatic transmission portion 20, so as to improve the drivability and fuel economy of the vehicle. In the hybrid control, the continuously-variable transmission portion 11 is controlled to function as the electrically controlled continuously-variable transmission, for optimum coordination of the engine speed $N_E$ and vehicle speed V for efficient operation of the engine 8, and the rotating speed of the power transmitting member 18 determined by the selected gear position of the automatic transmission portion 20. That is, the hybrid control means 52 determines a target value of the overall speed ratio γT of the transmission mechanism 10, so that the engine 8 is operated according to a stored highest-fuel-economy curve (fuel economy map or relationship). The target value of the overall speed ratio γT of the transmission mechanism 10 permits the engine torque $T_E$ and speed $N_E$ to be controlled so that the engine 8 provides an output necessary to drive the vehicle with the desired vehicle output. The highest-fuel-economy curve is obtained by experimentation so as to satisfy both of the requirement for improved operating efficiency and the requirement for improved fuel economy of the engine 8, and is defined in a two-dimensional coordinate system defined by an axis of the engine speed $N_E$ and an axis of the engine torque $T_E$. The hybrid control means 52 controls the speed ratio γ0 of the continuously-variable transmission portion 11, so as to obtain the target value of the overall speed ratio γT, so that the overall speed ratio γT can be controlled within a predetermined range, for example, between 13 and 0.5.

In the hybrid control, the hybrid control means 52 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, so that the second electric motor M2 is operated with the supplied electric energy, to produce a mechanical energy to be transmitted to the power transmitting member 18. Thus, the drive system is provided with an electric path through which an electric energy generated by conversion of a portion of a drive force of the engine 8 is converted into a mechanical energy. This electric path includes components associated with the generation of the electric energy and the consumption of the generated electric energy by the second electric motor M2. The hybrid control means 52 is further arranged to supply the second electric motor M2 with not only the electric energy generated by the first electric motor M1 but also the electric energy stored in the electric-energy storage device 60, for operating the second electric motor M2 to provide an assisting drive torque in addition to the drive force produced by the engine 8, when the vehicle accelerating value desired by the vehicle operator is relatively high.

It is also noted that the hybrid control means 52 is capable of establishing a so-called "motor starting and drive" mode in which the vehicle is started and driven by only the electric motor (e.g., second electric motor M2) used as the drive power source, by utilizing the electric CVT function of the continuously-variable transmission portion 11, irrespective of whether the engine 8 is in the non-operated state or in an idling state. The hybrid control means 52 is further arranged to control the reaction force of the first electric motor M1 operated as the electric generator, for thereby raising the rotating speed of the power transmitting member 18 owing to the differential function of the power distributing mechanism 16, to start the vehicle with the engine 8 used as the drive power source, when the vehicle is started with the engine 8 rather than the electric motor. Although the vehicle is usually started with the electric motor, as described above, the vehicle is started with the engine, depending upon the state of the vehicle.

The hybrid control means 52 is further capable of holding the engine 8 in an operated state owing to the electric CVT function of the continuously-variable transmission portion 11, irrespective of whether the vehicle is stationary or running at a relatively low speed. For example, the first electric motor M1 is required to be operated by the drive force of the engine 8, to generate an electric energy, when an amount of electric energy SOC stored in the electric-energy storage device 60 is reduced while the vehicle is stationary. In this case, the speed of the first electric motor M1 is raised, so that the differential function of the power distributing mechanism 16 permits the engine speed $N_E$ to be held higher than a lower limit above which the engine 8 is operable, even if the second electric motor speed $N_{M2}$ determined by the vehicle speed V is lowered to zero (substantially zero) while the vehicle is stationary.

The hybrid control means 52 is further capable of holding the engine speed $N_E$ constant at a given value or controlling the engine speed $N_E$ to a desired value, owing to the electric CVT function of the continuously-variable transmission portion 11, by controlling the operating speed $N_{M1}$ of the first electric motor M1 and/or the operating speed $N_{M2}$ of the second electric motor M2, irrespective of whether the vehicle is stationary or running. In other words, the hybrid control means 52 is capable of controlling the first electric motor speed $N_{M1}$ and/or the second electric motor speed $N_{M2}$, while holding the engine speed $N_E$ constant at a given value or controlling the engine speed $N_E$ to a desired value. To lower the second electric motor speed $N_{M2}$, for example, the hybrid control means 52 controls the second electric motor speed $N_{M2}$ so as to be lowered and controls the first electric motor speed $N_{M1}$ so as to be raised, while holding the engine speed $N_E$ constant, as is apparent from the collinear chart of FIG. 3. To lower the engine speed $N_E$ during running of the vehicle, the hybrid control means 52 controls the first electric motor speed $N_{M1}$ so as to be lowered, to thereby lower the engine speed $N_E$, since the second electric motor speed $N_{M2}$ is bound by the vehicle speed V.

The hybrid control means 52 is further capable of placing the continuously-variable transmission portion 11 in a state in which a torque cannot be transmitted therethrough, that is, in a state equivalent to a state in which the power transmitting path within the continuously-variable transmission portion 11 is disconnected. This state can be established by holding the first electric motor M1 in a free state in which the first electric motor M1 does not generate a reaction force.

Figure 6:
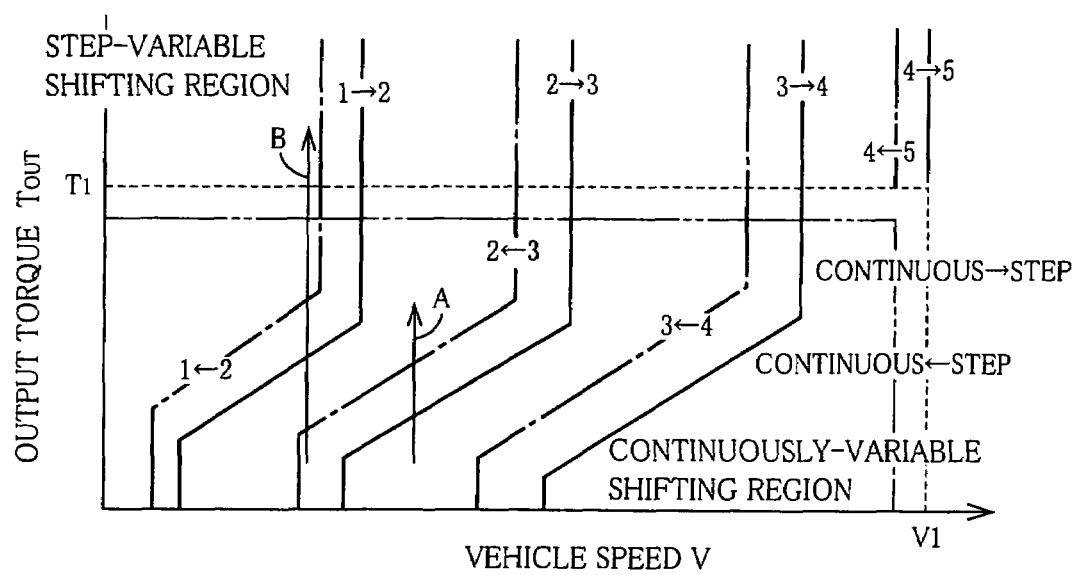
FIG. 6 is a view illustrating a stored shifting boundary line map used for determining a shifting action of an automatic transmission portion, in a two-dimensional coordinate system defined by axes of a vehicle speed and an output torque as control parameters, and a stored switching boundary line map in the same coordinate system, which is used for switching the transmission mechanism between the step-variable shifting state and the continuously-variable shifting state.

High-speed-gear determining means 62 is arranged to determine whether the gear position to which the transmission mechanism 10 should be shifted according to the shifting boundary line map of FIG. 6 stored in the memory means 56 is a high-speed-gear position, for example, the fifth gear position. This determination is made to determine which one of the switching clutch C0 and the switching brake B0 should be engaged to place the transmission mechanism 10 in the step-variable shifting state.

Switching control portion 50 is arranged to determine whether the shifting state of the transmission mechanism 10 should be changed, that is, whether the detected vehicle condition represented by the vehicle speed V and the output torque $T_{OUT}$ is in a continuously variable shifting region for placing the transmission mechanism 10 in the continuously-variable shifting state, or in a step-variable shifting region for placing the transmission mechanism 10 in the step-variable shifting state. This determination is made on the basis of the detected vehicle condition and according to a switching boundary line map (switching control map or relationship) stored in the memory means 56. An example of the switching boundary line map is indicated by broken and two-dot chain lines in FIG. 6. The switching control portion 50 selectively places the transmission mechanism 10 in the continuously-variable shifting state or step-variable shifting state, depending upon whether the present vehicle condition is in the continuously-variable shifting region or step-variable shifting region.

Described in detail, when the switching control portion 50 determines that the detected vehicle condition is in the step-variable shifting region, the switching control portion 50 disables the hybrid control means 52 to effect the hybrid control or continuously-variable shifting control, and enables the step-variable shifting control means 54 to effect a predetermined step-variable shifting control in which the automatic transmission portion 20 is automatically shifted according to the shifting boundary line map of FIG. 6 stored in the memory means 56, for example. In this step-variable shifting control, one of the gear positions of the automatic transmission portion 20 which is selected according to the shifting boundary line map of FIG. 6 is established by engaging the appropriate combination of the hydraulically operated frictional coupling devices C0, C1, C2, B0, B1, B2 and B3, as indicated in the table of FIG. 2, which indicates a predetermined relationship between each gear position of the transmission mechanism 10 and the corresponding combination of the frictional coupling devices. This relationship is stored in the memory means 56. Namely, the continuously-variable transmission portion 11 and the automatic transmission portion 20 are operated as a so-called "step-variable automatic transmission" which is automatically shifted according to the predetermined relationship of FIG. 2.

When the high-speed-gear determining means 62 has determined that the transmission mechanism 10 should be shifted to the fifth gear position, for example, the switching control portion 50 commands the hydraulic control unit 42 to release the switching clutch C0 and engage the switching brake B0, for enabling the continuously-variable transmission portion 11 to function as an auxiliary transmission having a fixed speed ratio $\gamma 0$ of 0.7, for example, so that the transmission mechanism 10 as a whole is placed in a high-speed gear position so-called "an overdrive gear position" having a speed ratio lower than 1.0. When the high-speed-gear determining means 62 has not determined that the transmission mechanism 10 should be shifted to the fifth gear position, the switching control portion 50 commands the hydraulic control unit 42 to engage the switching clutch C0 and release the switching brake B0, for enabling the continuously-variable transmission portion 11 to function as an auxiliary transmission having a fixed speed ratio $\gamma 0$ of 1.0, for example, so that the transmission mechanism 10 as a whole is placed in a speed-reducing gear position having a speed ratio not lower than 1.0. Thus, the transmission mechanism 10 is switched to the step-variable shifting state by the switching control means 50, and is selectively placed in one of the two gear positions while the transmission mechanism 10 is placed in the step-variable shifting state. Thus, the continuously-variable transmission portion 11 functions as the auxiliary transmission, while the automatic transmission portion 20 connected in series to the continuously-variable transmission portion 11 functions as the step-variable transmission, so that the transmission mechanism 10 as a whole functions as the so-called "step-variable automatic transmission".

When the switching control portion 50 has determined that the detected vehicle condition is in the continuously-variable shifting region for placing the transmission mechanism 10 in the continuously-variable shifting state, the switching control portion 50 commands the hydraulic control unit 42 to release both of the switching clutch C0 and brake B0, for placing the continuously-variable transmission portion 11 in the continuously-variable shifting state, to place the transmission mechanism 10 as a whole in the continuously-variable shifting state. At the same time, the switching control portion 50 enables the hybrid control means 52 to effect the hybrid control, and commands the step-variable shifting control means 54 to select and hold a predetermined one of the gear positions, or to permit an automatic shifting control according to the shifting boundary line map stored in the memory means 56. In the latter case, the variable-step shifting control means 54 effects the automatic shifting control by suitably selecting the combinations of the operating states of the frictional coupling devices indicated in the table of FIG. 2, except the combinations including the engagement of the switching clutch C0 and brake B0. Thus, the continuously-variable transmission portion 11 functions as the continuously variable transmission while the automatic transmission portion 20 connected in series to the continuously-variable transmission portion 11 functions as the step-variable transmission, so that the transmission mechanism 10 provides a sufficient vehicle drive force, such that the speed of the rotary motion transmitted to the automatic transmission portion 20 placed in one of the first through fourth gear positions, namely, the rotating speed of the power transmitting member 18 is continuously changed, so that the speed ratio of the transmission mechanism 10 when the automatic transmission portion 20 is placed in one of those gear positions is continuously variable over a predetermined range. Accordingly, the speed ratio of the automatic transmission portion 20 is continuously variable through the adjacent gear positions, whereby the overall speed ratio γT of the transmission mechanism 10 is continuously variable.

The maps shown in FIG. 6 will be described in detail. The shifting boundary line map (shifting control map or relationship) shown in FIG. 6 by way of example is stored in the memory means 56 and is used for determining whether the automatic transmission 20 should be shifted. The shifting boundary line map is represented in a two-dimensional coordinate system defined by axes of control parameters in the form of the vehicle speed V and the required output torque $T_{OUT}$ used as a drive-force-related value. In FIG. 6, the solid lines indicate shift-up boundary lines, while the one-dot chain lines indicate shift-down boundary lines. Further, the broken lines of FIG. 6 indicate an upper vehicle-speed limit V1 and an upper output-torque limit T1 used by the switching control means 50 to determine whether the vehicle condition is in the step-variable shifting region and the continuously-variable shifting region. Namely, the broken lines of FIG. 6 are a high-speed-running determining line that is a series of high-speed-running threshold values predetermined as the upper vehicle-speed limit V1 used for determining whether the hybrid vehicle is in a high-speed-running state, and a high-output-running determining line that is a series of high-output-running threshold values predetermined as the upper output-torque limit T1, which is used as the drive-force-related value relating to the drive force of the hybrid vehicle, for example, the output torque $T_{OUT}$ of the automatic transmission portion 20, for determining whether the hybrid vehicle is in a high-output running state. Further, two-dot chain lines in FIG. 6 indicate boundary lines offset with respect to the broken lines, by a suitable amount of control hysteresis, so that the broken lines and the two-dot chain lines are selectively used as the switching boundary lines between the step-variable shifting region and the continuously-variable shifting region. Thus, FIG. 6 shows the switching boundary line map (switching map or relationship) used by the switching control means 50 to determine whether the vehicle is in the step-variable shifting state or the continuously-variable shifting state, depending upon whether the vehicle speed V and the output torque $T_{OUT}$ are higher than the predetermined upper limit values V, T1. The shifting boundary line map and the switching boundary line map may be stored in the memory means 56, as a complex map. The switching boundary line map may include at least one of the boundary lines representative of the upper vehicle-speed limit V1 and the upper output-torque limit T1, and may use only one of the two parameters V and $T_{OUT}$.

The shifting boundary line map and the switching boundary line map may be replaced by stored equations for comparison of the actual vehicle speed V with the limit value V1 and comparison of the actual output torque $T_{OUT}$ with the limit value T1. In this case, the switching control means 50 switches the transmission mechanism 10 in the step-variable shifting state, when the detected actual vehicle speed V has exceeded the upper limit V1, or when the detected output torque $T_{OUT}$ of the automatic transmission portion 20 has exceeded the upper limit T1. The switching control means 50 may be arranged to place the transmission mechanism 10 in the step-variable shifting state even when the vehicle condition is in the continuously-variable shifting region, upon detection of any functional deterioration or defect of the components such as the first and second electric motors M1, M2, inverter 58 and electric-energy storage device 60 which are associated with the electric path described above and which are operable to operate the continuously-variable transmission portion 11 as the electrically controlled continuously variable transmission.

The drive-force-related value indicated above is a parameter corresponding to the drive force of the vehicle, which may be the output torque $T_{OUT}$ of the automatic transmission portion 20, the engine torque $T_E$ or an acceleration value of the vehicle, as well as a drive torque or drive force of drive wheels 38. The engine torque $T_E$ may be an actual value calculated on the basis of the accelerator pedal operating amount or the throttle valve opening angle (or intake air quantity, air/fuel ratio or amount of fuel injection) and the engine speed $N_E$, or an estimated value of the engine torque $T_E$ or required vehicle drive force which is calculated on the basis of the amount of operation of the accelerator pedal by the vehicle operator or the throttle valve operating angle. The vehicle drive torque may be calculated on the basis of not only the output torque $T_{OUT}$, etc., but also the ratio of the differential gear device 36 and the radius of the drive wheels 38, or may be directly detected by a torque sensor or the like.

For instance, the upper limit V1 of the vehicle speed is determined so that the transmission mechanism 10 is placed in the step-variable shifting state while the vehicle speed V is higher than the upper limit V1. This determination is effective to minimize a possibility of deterioration of the fuel economy of the vehicle if the transmission mechanism 10 were placed in the continuously-variable shifting state at a relatively high running speed of the vehicle. The upper limit T1 of the output torque $T_{OUT}$ is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle.

Figure 7:
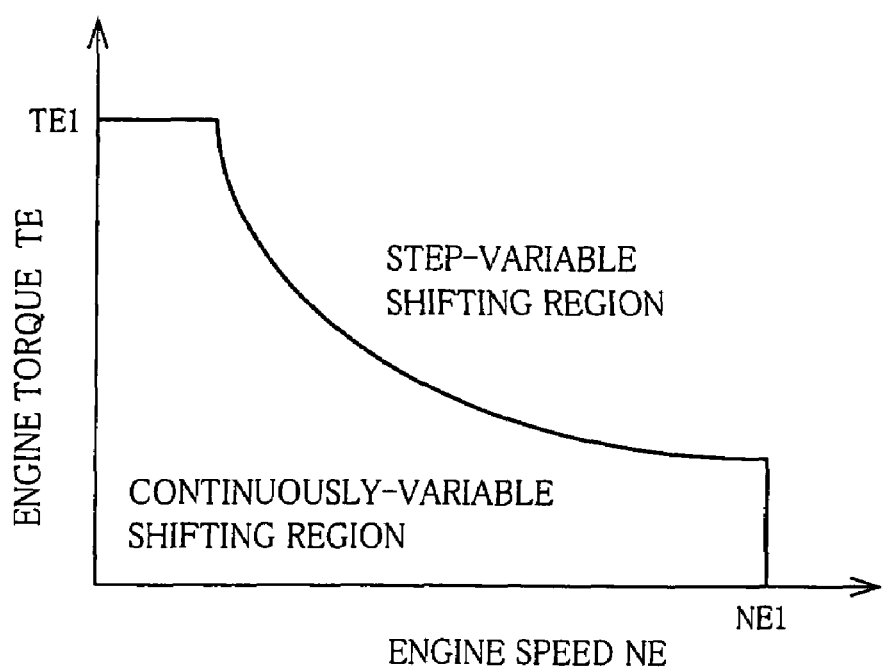
FIG. 7 is a view illustrating a shifting-region switching map indicating boundary lines defining a step-variable shifting region and a continuously-variable shifting region, the boundary lines of those shifting regions corresponding to boundary lines of the switching control map represented by broken lines in FIG. 6.

Referring to FIG. 7, there is shown a shifting-region switching map which is stored in the memory means 56 and which indicates boundary lines (switching control map or relationship) defining the step-variable shifting region and continuously-variable shifting region in a two-dimensional coordinate system which is defined by axes of control parameters in the form of the engine speed $N_E$ and the engine torque $N_T$. The boundary lines of the shifting-region switching map are considered to be engine output lines. The switching control means 50 may use the shifting-region switching map of FIG. 7 in place of the switching boundary line map of FIG. 6, to determine, on the basis of by the engine speed $N_E$ and the engine torque $T_E$, whether the detected vehicle condition represented by the engine speed $N_E$ and the engine torque $T_E$ is in the continuously-variable or step-variable shifting region. The switching boundary line map of FIG. 6 which is indicated by the broken lines in FIG. 6 is based on the map of FIG. 7. In other words, the broken lines in FIG. 6 are switching boundary lines which are represented in the two-dimensional coordinate system defined by the axes of the control parameters in the form of the vehicle speed V and the output torque $T_{OUT}$, on the basis of the relationship (map) shown in FIG. 7.

Figure 8:
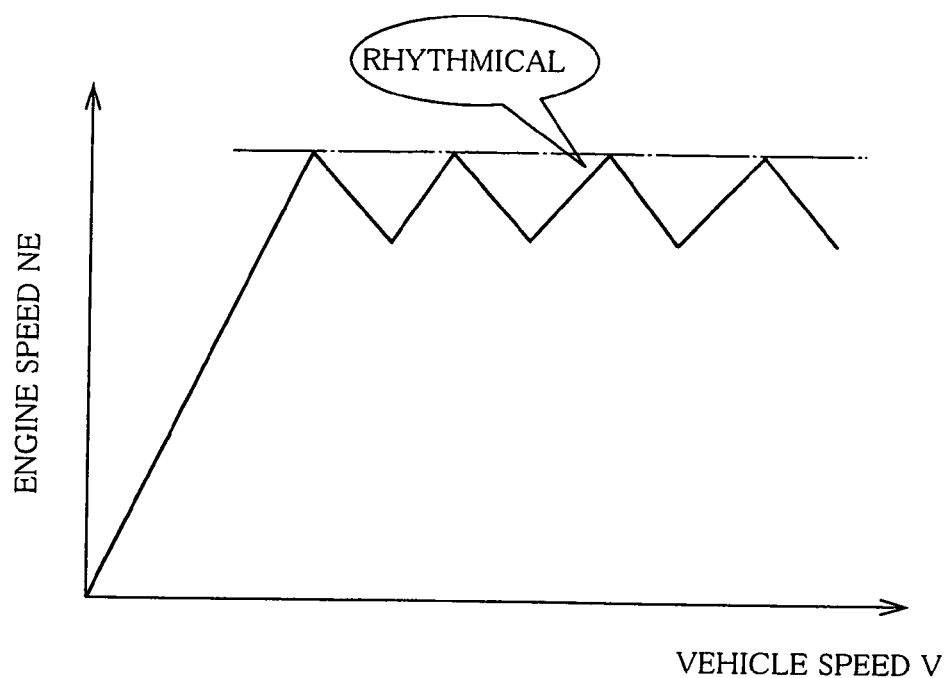
FIG. 8 is a view indicating an example of a change of the engine speed as a result of a shift-up action of the step-variable transmission.

The step-variable shifting region defined by the switching boundary line map of FIG. 6 is defined as a high-torque region in which the output torque $T_{OUT}$ is not lower than the predetermined upper limit $T_1$, or a high-speed region in which the vehicle speed V is not lower than the predetermined upper limit $V_1$. Accordingly, the step-variable shifting control is effected when the torque of the engine 8 is comparatively high or when the vehicle speed V is comparatively high, while the continuously-variable shifting control is effected when the torque of the engine 8 is comparatively low or when the vehicle speed V is comparatively low, that is, when the engine 8 is in a normal output state. Similarly, the step-variable shifting region defined by the shifting-region switching map of FIG. 7 is defined as a high-torque region in which the engine torque $T_E$ is not lower than the predetermined upper limit $T_{E1}$, or a high-speed region in which the engine speed $N_E$ is not lower than the predetermined upper limit $N_{E1}$, or alternatively defined as a high-output region in which the output of the engine 8 calculated on the basis of the engine torque $N_T$ and speed $N_E$ is not lower than a predetermined limit. Accordingly, the step-variable shifting control is effected when the torque $T_E$, speed $N_E$ or output of the engine 8 is comparatively high, while the continuously-variable shifting control is effected when the torque $T_E$, speed $N_E$ or output of the engine 8 is comparatively low, that is, when the engine 8 is in the normal output state. The boundary lines of the shifting-region switching map of FIG. 7 may be considered as high-speed threshold lines or high-engine-output threshold lines, which define upper limit of the vehicle speed V or engine output described above In the present embodiment described above, the transmission mechanism 10 is placed in the continuously-variable shifting state in a low-speed or medium-speed running state of the vehicle or in a low-output or medium-output running state of the vehicle, assuring a high degree of fuel economy of the hybrid vehicle. In a high-speed running of the vehicle at the vehicle speed V higher than the upper limit V1, the transmission mechanism 10 is placed in the step-variable shifting state in which the output of the engine 8 is transmitted to the drive wheels 38 primarily through the mechanical power transmitting path, so that the fuel economy is improved owing to reduction of a loss of conversion of the mechanical energy into the electric energy, which would take place when the continuously-variable transmission portion 11 (power distributing mechanism 16) functions as the electrically controlled continuously variable transmission. In a high-output running state of the vehicle with the output torque $T_{OUT}$ higher than the upper limit T1, too, the transmission mechanism 10 is placed in the step-variable shifting state. Therefore, the transmission mechanism 10 is placed in the continuously-variable shifting state only when the vehicle speed V is relatively low or medium or when the engine output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first electric motor M1 and the second electric motor M2, and the required size of the drive system including those electric motors. Alternatively, in the high-output running state of the vehicle, the transmission mechanism 10 is placed in the step-variable shifting state (fixed-speed-ratio shifting state), so that the engine speed $N_E$ changes with a shift-up action of the automatic transmission portion 20, assuring a comfortable rhythmic change of the engine speed $N_E$ as the automatic transmission portion 20 is shifted up, as indicated in FIG. 8. Stated in the other way, when the engine is in the high-output state, it is more important to satisfy a vehicle operator's desire to improve the drivability of the vehicle, than a vehicle operator's desire to improve the fuel economy. In this respect, the transmission mechanism 10 is switched from the continuously-variable shifting state to the step-variable shifting state (fixed-speed-ratio shifting state) when the engine output becomes relatively high. Accordingly, the vehicle operator is satisfied with a comfortable rhythmic change of the engine speed $N_E$ during the high-output operation of the engine, as indicated in FIG. 8.

Figure 9:
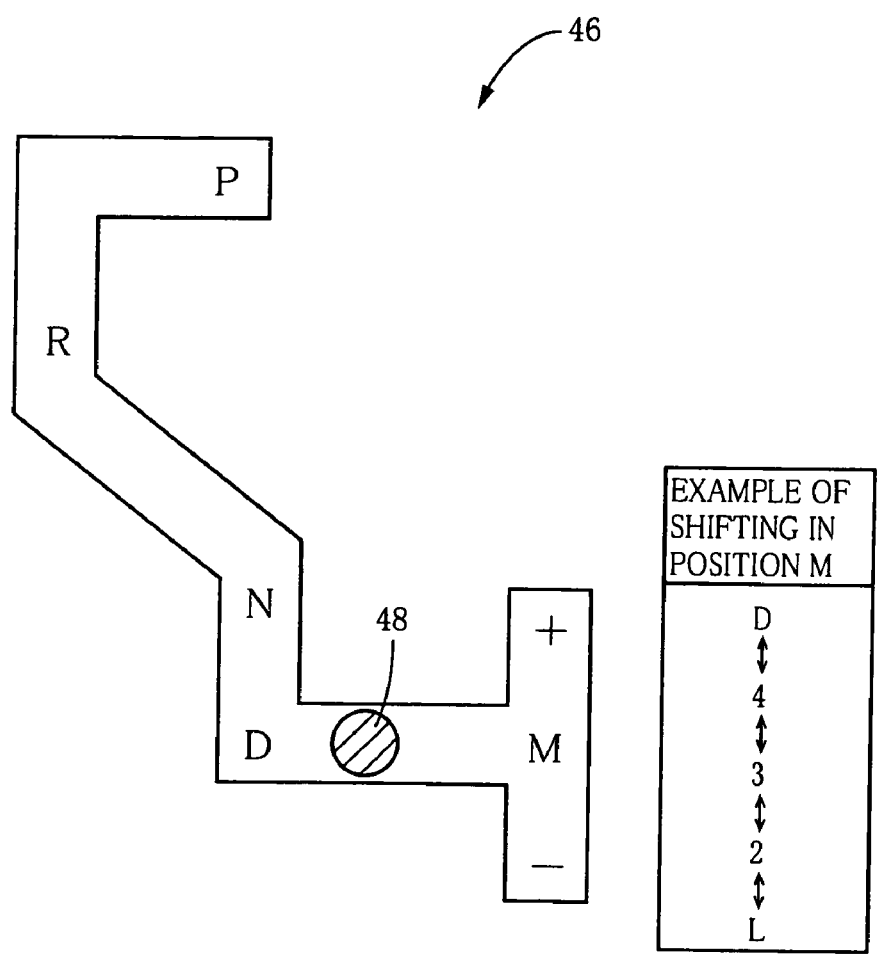
FIG. 9 is a view illustrating an example of a manually operable shifting device having a plurality of operating positions.

FIG. 9 shows an example of a manually operable shifting device in the form of a shifting device 46 including the above-described shift lever 48, which is disposed laterally adjacent to an operator's seat, for example, and which is manually operated to select one of a plurality of operating positions consisting of a parking position P for placing the transmission mechanism 10 (namely, automatic transmission 20) in a neutral state in which a power transmitting path is disconnected with both of the clutches C1 and C2 placed in the released state, while at the same time the output shaft 22 of the automatic transmission 20 is in the locked state; a reverse-drive position R for driving the vehicle in the rearward direction; a neutral position N for placing the transmission mechanism 10 in the neutral state; an automatic forward-drive position D; and a manual forward-drive position M.

When the shift lever 48 is operated to a selected one of the positions P, R, N, D and M, a manual valve incorporated in the hydraulic control unit 42 and operatively connected to the4 shift lever 48 is operated to establish the corresponding state of the hydraulic control unit 42. In the automatic forward-drive position D or the manual forward-drive position M, one of the first through fifth gear positions ($1^{st}$ through $5^{th}$) indicated in the table of FIG. 2 is established by electrically controlling the appropriate solenoid-operated valves incorporated in the hydraulic control unit 42.

The above-indicated parking position P and the neutral position N are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power-cut-off state established by releasing both of the clutches C1 and C2, as shown in the table of FIG. 2. In the drive positions R, D, M, the power transmitting path in the automatic transmission portion 20 is in the power-transmitting state established by engaging at least one of the clutches C1 and C2, as also shown in the table of FIG. 2.

Described in detail, a manual operation of the shift lever 48 from the parking position P or neutral position N to the reverse-drive position R causes the second clutch C2 to be engaged for switching the power transmitting path in the automatic transmission portion 20 from the power-cut-off state to the power-transmitting state. A manual operation of the shift lever 48 from the neutral position N to the automatic forward-drive position D causes at least the first clutch C1 to be engaged for switching the power transmitting path in the automatic transmission portion 20 from the power-cut-off state to the power-transmitting state. The automatic forward-drive position D provides a highest-speed position, and positions "4" through "L" selectable in the manual forward-drive position M are engine-braking positions in which an engine brake is applied to the vehicle.

The manual forward-drive position M is located at the same position as the automatic forward-drive position D in the longitudinal direction of the vehicle, and is spaced from or adjacent to the automatic forward-drive position D in the lateral direction of the vehicle. The shift lever 48 is operated to the manual forward-drive position M, for manually selecting one of the above-indicated positions "D" through "L". Described in detail, the shift lever 48 is movable from the manual forward-drive position M to a shift-up position "+" and a shift-down position "−", which are spaced from each other in the longitudinal direction of the vehicle. Each time the shift lever 48 is moved to the shift-up position "+" or the shift-down position "−", the presently selected position is changed by one position. The five positions "D" through "L" have respective different lower limits of a range in which the overall speed ratio γT of the transmission mechanism 10 is automatically variable, that is, respective different lowest values of the overall speed ratio γT which corresponds to the highest output speed of the transmission mechanism 10. Namely, the five positions "D" through "L" select respective different numbers of the speed positions (gear positions) of the automatic transmission portion 20 which are automatically selectable, so that the lowest overall speed ratio γT available is determined by the selected number of the gear positions. The shift lever 48 is biased by biasing means such as a spring so that the shift lever 48 is automatically returned from the shift-up position "+" and shift-down position "−" back to the manual forward-drive position M. The shifting device 46 is provided with a shift-position sensor operable to detect the presently selected position of the shift lever 48, so that signals indicative of the presently selected operating position of the shift lever 48 and the number of shifting operations of the shift lever 48 in the manual forward-shifting position M.

When the shift lever 48 is operated to the automatic forward-drive position D, the switching control means 50 effects an automatic switching control of the transmission mechanism 10 according to the stored switching boundary line map indicated in FIG. 6, and the hybrid control means 52 effects the continuously-variable shifting control of the power distributing mechanism 16, while the step-variable shifting control means 54 effects an automatic shifting control of the automatic transmission 20. When the transmission mechanism 10 is placed in the step-variable shifting state, for example, the shifting action of the transmission mechanism 10 is automatically controlled to select an appropriate one of the first through the fifth gear position indicated in FIG. 2. When the drive system is placed in the continuously-variable shifting state, the speed ratio of the power distributing mechanism 16 is continuously changed, while the shifting action of the automatic transmission 20 is automatically controlled to select an appropriate one of the first through fourth gear positions, so that the overall speed ratio γT of the transmission mechanism 10 is controlled so as to be continuously variable within the predetermined range. The automatic forward-drive position D is a position selected to establish an automatic shifting mode (automatic mode) in which the transmission mechanism 10 is automatically shifted.

When the shift lever 48 is operated to the manual forward-drive position M, on the other hand, the shifting action of the transmission mechanism 10 is automatically controlled by the switching control means 50, hybrid control means 52 and step-variable shifting control means 54, such that the overall speed ratio γT is variable within a predetermined range the lower limit of which is determined by the gear position having the lowest speed ratio, which gear position is determined by the manually selected one of the positions "D" through "L". When the transmission mechanism 10 is placed in the step-variable shifting state, for example, the shifting action of the transmission mechanism 10 is automatically controlled within the above-indicated predetermined range of the overall speed ratio γT. When the transmission mechanism 10 is placed in the step-variable shifting state, the speed ratio of the power distributing mechanism 16 is continuously changed, while the shifting action of the automatic transmission 20 is automatically controlled to select an appropriate one of the gear positions the number of which is determined by the manually selected one of the positions "D" through "L", so that the overall speed ratio γT of the transmission mechanism 10 is controlled so as to be continuously variable within the predetermined range. The manual forward-drive position M is a position selected to establish a manual shifting mode (manual mode) in which the selectable gear positions of the transmission mechanism 10 are manually selected.

There will be described other embodiments of the present invention. In the following description, the same reference signs as used in the preceding embodiment are used to identify the common elements, which will not be described.

Embodiment 2

Figure 10:
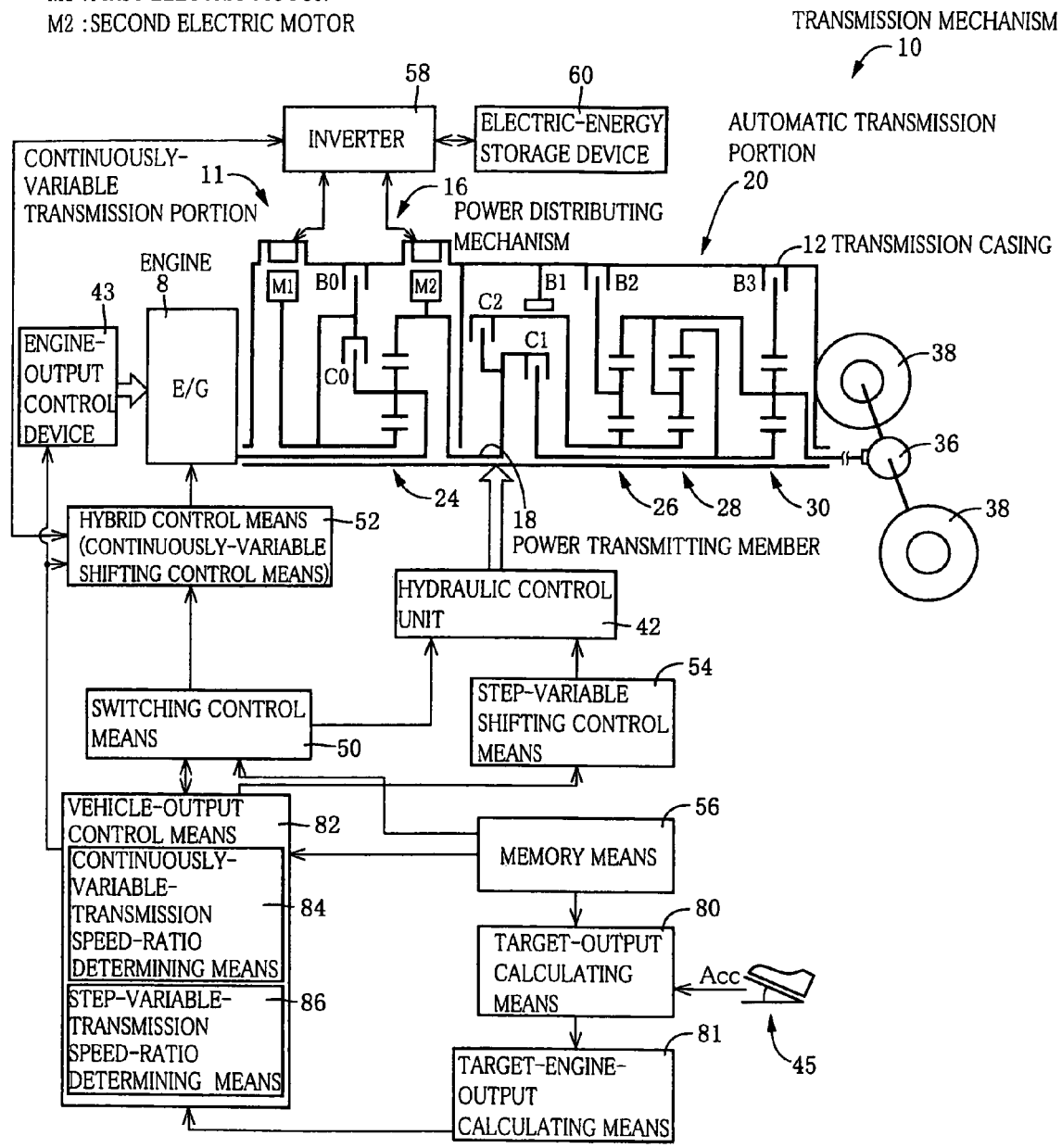
FIG. 10 is a functional block diagram which illustrates major control functions of the electronic control device of FIG. 4, and which corresponds to that of FIG. 5.
Figure 11:
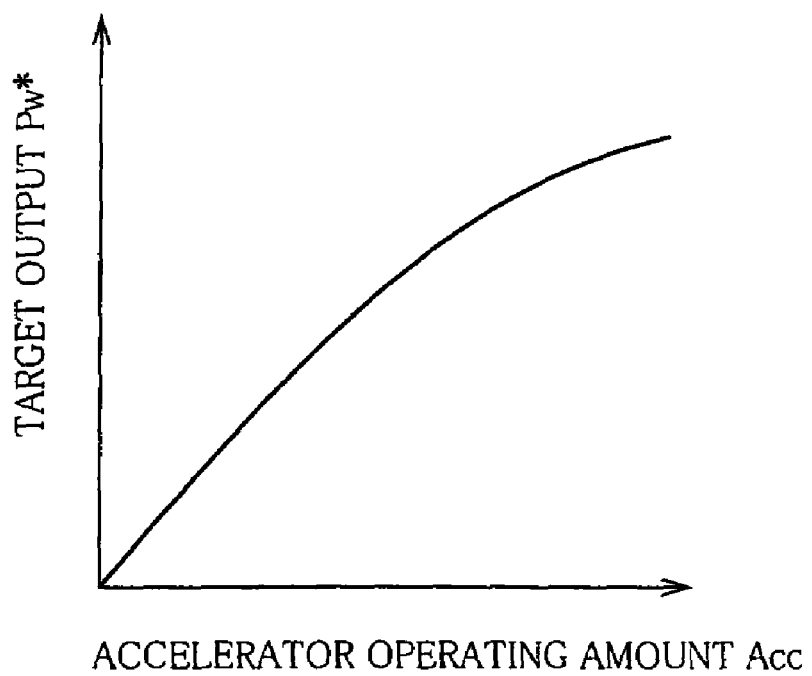
FIG. 11 is a view showing an example of a stored relationship (map) between an accelerator operating amount and a target output.

Referring to the functional block diagram of FIG. 10, there are shown major control functions of the electronic control device 40. Target-output calculating means 80 shown in FIG. 10 is arranged to calculate (determine) a target output of the vehicle, that is, a target vehicle output $P_W^*$ at the drive wheels 38, on the basis of a vehicle output desired by the vehicle operator, namely, the operating amount $A_{CC}$ of an accelerator pedal 45. For instance, the target-output calculating means 80 calculates the target output $P_W^*$ on the basis of the actual accelerator pedal operating amount $A_{CC}$ and according to a predetermined relationship between the accelerator pedal operating amount $A_CC$ and the target output $P_W^*$, which relationship is stored in the memory means 56 and which is shown in FIG. 11 by way of example.

Target-engine-output calculating means 81 is arranged to calculate a target engine output $P_E^*$ for obtaining the target vehicle output $P_W^*$ calculated by the target-output calculating means 80, on the basis of the calculated target vehicle output $P_W^*$. Described in detail, the target-engine-output calculating means 81 calculates the target engine output $P_E^*$, so as to compensate for a transmission power loss of the drive system in the form of the transmission mechanism 10 for the calculated target vehicle output $P_W^*$. The target-engine-output calculating means 81 is further arranged to calculate the target engine output $P_E^*$, so as to compensate for a power loss due to loads acting on the air conditioner, a power steering system and other devices optionally provided on the vehicle, as well as the above-indicated transmission power loss, for the calculated target vehicle output $P_W^*$. For instance, the target-engine-output calculating means 81 calculates the target engine output $P_E^*$ on the basis of the target vehicle output $P_W^*$ calculated by the target-output calculating means 80, and according to a relationship between the target vehicle output $P_W^*$ and the target engine output $P_E^*$, which relationship is stored in the memory means 56 and which is obtained by experimentation so as to take account of the above-indicated power transmission loss and the power loss due to the loads of the optionally provided devices.

Vehicle-output control means 82 includes continuously-variable-transmission speed-ratio determining means 84 for determining a target speed ratio γ0 of the continuously-variable transmission portion 11, and step-variable-transmission speed-ratio determining means 86 for determining a target speed ratio γ (desired gear position) of the automatic transmission portion 20. The vehicle-output control means 82 determines a speed ratio γ0* of the continuously-variable transmission portion 11 and the speed ratio γ* (desired gear position) of the automatic transmission portion 20, on the basis of the actual vehicle speed V and the target engine output $P_E^*$ calculated by the target-engine-output calculating means 81, such that an operating point of the engine 8, that is, an engine output $P_E$ determined by the engine speed $N_E$ and the engine torque $T_E$ coincides with the target engine output $P_E^*$.

As described above, the transmission mechanism 10 (continuously-variable transmission portion 11) can be placed selectively in one of the continuously-variable shifting state and the step-variable shifting state (fixed-speed-ratio shifting state). In the continuously-variable shifting state of the continuously-variable transmission portion 11, the speed ratio γ0 of the continuously-variable transmission portion 11 is variable by using the first electric motor M1, for example, owing to the continuously-variable transmission portion 11 functioning as the electrically controlled continuously variable transmission, irrespective of the vehicle speed V, namely, the rotating speed of the power transmitting member 18. In the step-variable shifting state of the continuously-variable transmission portion 11, on the other hand, the continuously-variable transmission portion 11 has the speed ratio of 1 when the switching clutch C0 is in the engaged state, and the speed ratio of about 0.7 when the switching brake B0 is in the engaged state. There will be described methods by which the vehicle-output control means 82 determines the speed ratio γ0* of the continuously-variable transmission portion 11 and the speed ratio γ* (desired gear position) of the automatic transmission portion 20, in the continuously-variable shifting state and the step-variable shifting state of the continuously-variable transmission portion 11.

Figure 12:
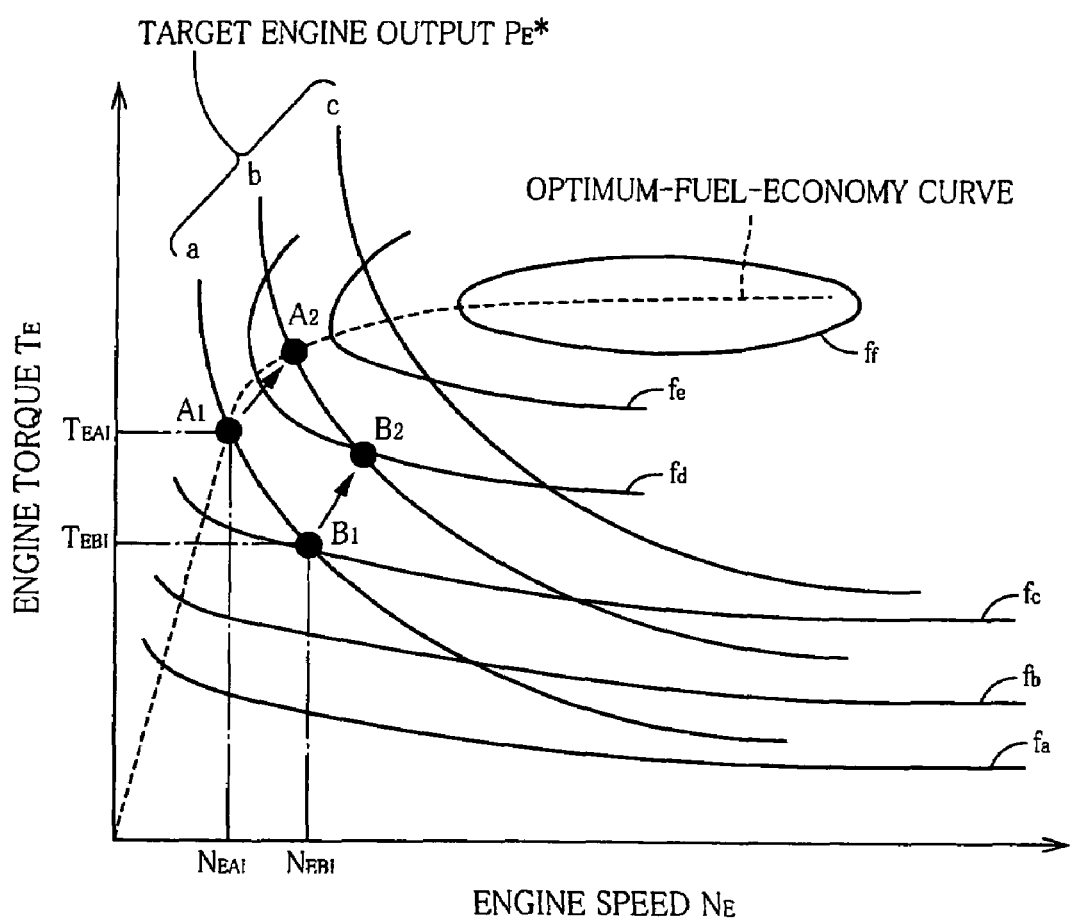
FIG. 12 is a view showing a fuel economy map of an engine, wherein broken line represents a highest-fuel-economy curve (may or relationship) of the engine which is obtained by experimentation and which satisfies both of operating efficiency and fuel economy of the engine.

Referring to FIG. 12, there is shown a fuel economy curve (map or relationship: hereinafter referred to as "fuel economy map") of the engine 8. In FIG. 12, solid lines $f_1$-$f_f$ are iso-fuel-economy curves f, each of which, like contour lines, connects points of equal fuel economy in a two-dimensional coordinate system defined by axes of two parameters in the form of the engine speed $N_E$ and the engine torque $T_E$. The fuel consumption ratio represented by the iso-fuel-economy curves f decreases, that is, the fuel economy represented by the curves f increases as the curves f are located nearer to a medium-speed high-load region of the engine 8 in the two-dimensional coordinate system, in which the fuel economy is the highest. Broken line in FIG. 12 is an optimum fuel-economy curve which was obtained by experimentation and which is a curve connecting points of lowest fuel consumption ratio which are reached as the engine speed $N_E$ rises. The optimum fuel-economy curve obtained by experimentation is formed of a series of the points of lowest fuel consumption, which are stored in the memory means 56 and which satisfy both of the requirement for improved operating efficiency and the requirement for improved fuel economy of the engine.

Solid lines "a", "b" and "c" in FIG. 12 are examples of lines each formed of a series of operating points of the engine 8 which correspond to the same target engine output $P_E^*$ calculated by the target-engine-output calculating means 81. The values of the target engine output $P_E^*$ represented by the lines a, b and c increase in the order of description of the lines.

The vehicle-output control means 82 determines a target value γT* of the overall speed ratio γT of the transmission mechanism 10 within a predetermined range available, and determines a target intake air quantity $Q_{AIR}^*$, on the basis of the actual vehicle speed V and the target engine output $P_E^*$ calculated by the target-engine-output calculating means 81, such that the operating point of the engine follows the optimum fuel-economy curve of FIG. 12 and such that the engine 8 provides the target engine output $P_E^*$, when the switching control means 50 determines, on the basis of the actual vehicle state represented by the vehicle speed V and the output torque $T_{OUT}$ and according to the switching boundary line map of FIG. 6, for example, that the actual vehicle state is in the continuously-variable shifting region in which the transmission mechanism 10 is placed in the continuously-variable shifting state, or that the actual vehicle state has changed to the continuously-variable shifting region, requiring the transmission mechanism 10 to be switched to the continuously-variable shifting state.

Described in detail, the step-variable-transmission speed-ratio determining means 86 determines the desired gear position, (that is, the target speed ratio γ*) of the automatic transmission portion 20 in which the operating point of the engine corresponding to the target engine output $P_E^*$ is located relatively close to the optimum fuel-economy curve shown in FIG. 12. For instance, the step-variable-transmission determining means 86 determines the desired gear position or speed ratio γ* of the automatic transmission portion 20 for establishing the operating point of the engine which provides the target engine output $_{PE}^*$ and which is located relatively close to the optimum fuel economy curve of FIG. 12. This determination is made on the basis of the actual vehicle state represented by the vehicle speed V and the output torque $T_{OUT}$ of the automatic transmission portion 20 and according to the shifting boundary line map (shifting control map) which are represented by solid lines and one-dot chain lines in FIG. 6 and which are obtained by experimentation and stored in the memory means 56. The continuously-variable-transmission speed-ratio determining means 84 determines the target speed ratio γ0* of the continuously-variable transmission portion 11 for establishing the above-indicated target overall speed ratio γT*, on the basis of the target overall speed ratio γT*, the target speed ratio γ* of the automatic transmission portion 20, and a known relationship between the target speed ratio γ0* and the target speed ratio γ*. In other words, the continuously-variable-transmission speed-ratio determining means 84 determines the speed ratio γ0* such that the operating point of the engine corresponding to the target speed ratio γ* (gear position) of the automatic transmission portion 20 determined by the step-variable-transmission speed-ratio determining means 86 is located as close as possible to the optimum fuel-economy curve shown in FIG. 12.

The vehicle-output control means 82 determines the target intake air quantity $Q_{AIR}^*$ for obtaining the operating point of the engine on the optimum fuel-economy curve, which provides the target engine torque $T_E^*$ satisfying the target engine output $P_E^*$. For example, the calculates (determines) a target opening angle $\theta_{TH}^*$ of the throttle valve as the target intake air quantity $Q_{AIR}^*$, on the basis of the target engine speed $N_E^*$ and the target engine torque $T_E^*$, and according to a stored relationship (map) shown in FIG. 13 which is formulated to calculate an estimated engine torque $T_{EO}$ on the basis of the throttle valve opening angle $\theta_{TH}$ and the engine speed $N_E$.

The vehicle-output control means 82 commands the hybrid control means 52 to control the continuously-variable transmission portion 11 such that the speed ratio γ0 coincides with the target value γ0* determined by the continuously-variable-transmission speed-ratio determining means 84, and further commands the step-variable shifting control means 54 to control the automatic transmission portion 20 such that the speed ratio γ coincides with the target value γ* determined by the step-variable-transmission speed-ratio determining means 86. At the same time, the vehicle-output control means 82 commands the engine-output control device 43 to control the engine such that the opening angle $\theta_{TH}$ of the throttle valve coincides with the target value $\theta_{TH}*$. In the present embodiment, the hybrid control means 52 is not arranged to control the speed ratio $\gamma 0$ of the continuously-variable transmission portion 11 in the manner described above with respect to the preceding embodiment, but is arranged to control the speed ratio $\gamma 0$ of the continuously-variable transmission portion 11, according to the command received from the vehicle-output control means 82, by controlling the first electric motor M1 and/or the second electric motor M2, such that the target speed ratio $\gamma 0*$ is established. The step-variable shifting control means 54 is not arranged to control the shifting of the automatic transmission portion 20 according to the shifting map in the manner described above with respect to the preceding embodiment, but is arranged to command the hydraulic control unit 42 according to the command received from the vehicle-output control means 82, for selectively engaging and releasing the hydraulically operated frictional coupling devices so as to establish the desired gear position (target speed ratio $\gamma*$) of the automatic transmission portion 20, according to the table of FIG. 2, for example. The engine-output control device 43 commands the throttle actuator for controlling the opening angle of the electronic throttle valve according to the command received from the vehicle-output control means 82.

Points $A_1$ and $A_2$ in FIG. 12 are examples of the operating point of the engine 8 in the continuously-variable shifting state of the transmission mechanism 10. For instance, the point $A_1$ is a point of intersection between the solid line "a" representing the target engine output $P_E*$ and the optimum fuel-economy curve indicated by the broken line. The vehicle-output control means 82 determines the target overall speed ratio $\gamma T*$ so as to obtain an engine speed $N_{EA1}$ at the point $A_1$, on the basis of the vehicle speed V, and determines the target intake air quantity $Q_{AIR}*$ for obtaining an engine torque $T_{EA1}$ at the point $A_1$. The vehicle-output control means 82 commands the hybrid control means 52, the step-variable shifting control means 54 and the engine-output control device 43, so as to obtain the target overall speed ratio $\gamma T*$ and the target intake air quantity $Q_{AIR}*$ at the point $A_1$.

When the operating amount of the accelerator pedal 45 is increased, for example, the target engine output PE* is changed from a value on the solid line "a" to a value on the solid line "b", so that the operating point of the engine is moved from the point $A_1$, to the point A2 which is a point of intersection of the solid line "b" and the optimum fuel-economy curve indicated by the broken line. The vehicle-output control means 82 determines the target overall speed ratio $\gamma T*$ at the point $A_2$, and the target intake air quantity $Q_{AIR}*$ at the point $A_2$, and commands the hybrid control means 42, the step-variable shifting control means 54 and the engine-output control device 43, so as to obtain the target overall speed ratio $\gamma T*$ and the target intake air quantity $Q_{AIR}*$ at the point $A_2$, so that the transmission mechanism 10 is shifted as a result of an increase in the operating amount of the accelerator pedal 45.

The vehicle-output control means 82 determines the target value $\gamma T*$ of the overall speed ratio $\gamma T$ of the transmission mechanism 10 and the target intake air quantity $Q_{AIR}*$, on the basis of the actual vehicle speed V and the target engine output $P_E*$ calculated by the target-engine-output calculating means 81, such that the operating point of the engine follows the optimum fuel-economy curve of FIG. 12 and such that the engine 8 provides the target engine output $P_E*$, when the switching control means 50 determines, on the basis of the actual vehicle state represented by the vehicle speed V and the output torque $T_{OUT}$ and according to the switching boundary line map of FIG. 6, for example, that the actual vehicle state is in the step-variable shifting region in which the transmission mechanism 10 is placed in the step-variable shifting state, or that the actual vehicle state has changed to the step-variable shifting region, requiring the transmission mechanism 10 to be switched to the step-variable shifting state. For instance, the vehicle-output control means 82 determines the desired gear position of the automatic transmission portion 20 and the target overall speed ratio $\gamma T*$ of the transmission mechanism 10, for establishing the operating point of the engine which provides the target engine output $_{PE}*$ and which is located relatively close to the optimum fuel economy curve of FIG. 12. This determination is made on the basis of the actual vehicle state represented by the vehicle speed V and the output torque $T_{OUT}$ of the automatic transmission portion 20 and according to the shifting boundary lines (shifting control map) which are represented by the solid lines and one-dot chain lines in FIG. 6 and which are obtained by experimentation and stored in the memory means 56.

Described in detail, where the target overall speed ratio $\gamma T*$ is obtained while the automatic transmission portion 20 is placed in any one of the first gear position through the fourth gear position, the continuously-variable-transmission speed-ratio determining means 84 determines the target speed ratio $\gamma 0*$ of the continuously-variable transmission portion 11 to be equal to 1, while the step-variable-transmission speed-ratio determining means 86 determines the target speed ratio $\gamma*$ of the automatic transmission portion 20 to be equal to the speed ratio of the above-indicated one of the first through fourth gear positions. Where the target overall speed ratio $\gamma T*$ is obtained while the automatic transmission portion 20 is placed in the fifth gear position, the continuously-variable-transmission speed-ratio determining means 84 determines the target speed ratio $\gamma 0*$ of the continuously-variable transmission portion 11 to be equal to about 0.7, while the step-variable-transmission speed-ratio determining means 86 determines the target speed ratio $\gamma*$ of the automatic transmission portion 20 to be equal to the speed ratio of the fourth gear position.

Figure 13:
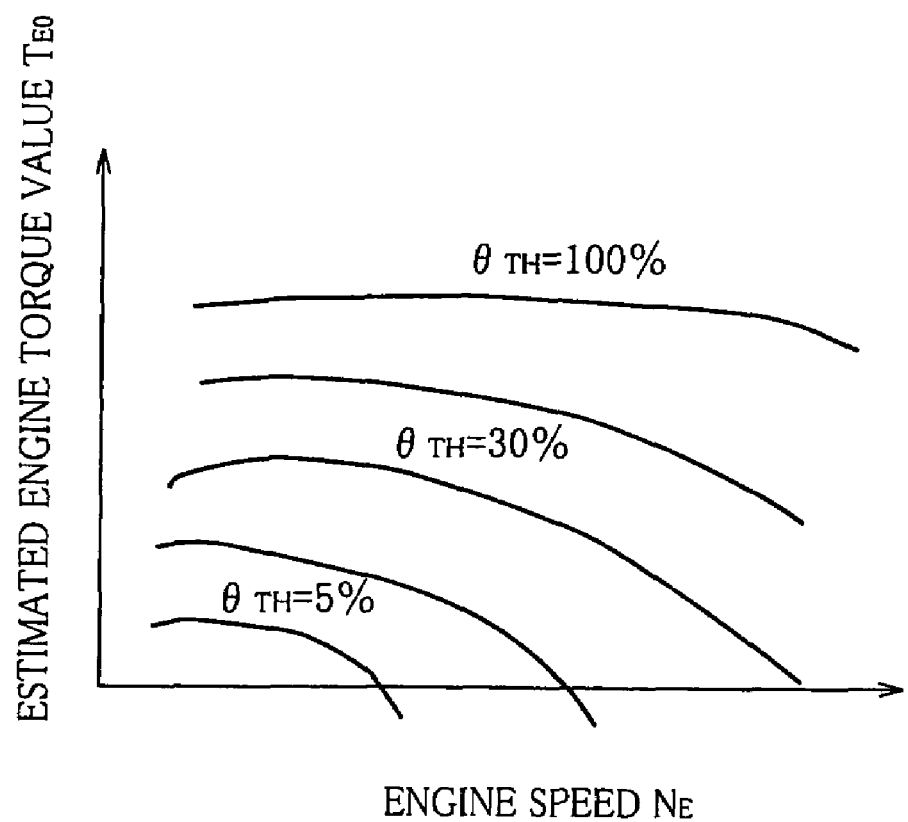
FIG. 13 is a view showing a stored relationship (map) for calculating an estimated engine torque on the basis of throttle valve opening angle and engine speed.

The vehicle-output control means 82 determines the target opening angle $\theta_{TH}*$ of the throttle valve as the target intake air quantity $Q_{AIR}*$ for obtaining the operating point of the engine providing the target engine torque $T_E*$, according to the stored relationship (map) shown in FIG. 13, as in the case where the transmission mechanism 10 is placed in the continuously-variable shifting state.

The vehicle-output control means 82 commands the switching control means 50 to control the continuously-variable transmission portion 11 such that the speed ratio $\gamma 0$ coincides with the target value $\gamma 0*$ determined by the continuously-variable-transmission speed-ratio determining means 84, and further commands the step-variable shifting control means 54 to control the automatic transmission portion 20 such that the speed ratio $\gamma$ coincides with the target value $\gamma*$ determined by the step-variable-transmission speed-ratio determining means 86. At the same time, the vehicle-output control means 82 commands the engine-output control device 43 to control the engine such that the opening angle $\theta_{TH}$ of the throttle valve coincides with the target value $\theta_{TH}*$. The switching control means 50 commands the hydraulic control unit 42 according to the command received from the vehicle-output control means 82, to engage the switching clutch C0 and release the switching brake B0, for establishing the target speed ratio $\gamma 0*$ of 1, or to release the switching clutch C0 and engage the switching brake B0, for establishing the target speed ratio γ0* of about 0.7. In the present embodiment, the step-variable shifting control means 54 is not arranged to control the shifting of the automatic transmission portion 20 according to the shifting map in the manner described above with respect to the preceding embodiment, but is arranged to command the hydraulic control unit 42 according to the command received from the vehicle-output control means 82, for selectively engaging and releasing the hydraulically operated frictional coupling devices so as to establish the desired gear position (target speed ratio γ*) of the automatic transmission portion 20, according to the table of FIG. 2, for example. The engine-output control device 43 commands the throttle actuator for controlling the opening angle of the electronic throttle valve according to the command received from the vehicle-output control means 82.

Points $B_1$ and $B_2$ in FIG. 12 are examples of the operating point of the engine 8 in the step-variable shifting state of the transmission mechanism 10. In the step-variable shifting state of the transmission mechanism 10, the target overall speed ratio γT* is any one of the speed ratios of the first through fifth gear positions, so that the operating point of the engine 8 cannot lie on the optimum fuel-economy curve indicated by the broken line. For instance, the point $B_1$ is a point which lies on the solid line "a" representing the target engine output $P_E^*$ and at which the engine speed $N_E$ is equal to a value $N_{EB1}$ determined by the vehicle speed V and the target overall speed ratio γT* of the transmission mechanism 10 determined by the vehicle-output control means 82. The target intake air quantity $Q_{AIR}^*$ for obtaining an engine torque $T_{EB1}$, that is, for obtaining the target engine output $P_E^*$, is determined by the vehicle-output control means 82 on the basis of the engine speed $N_{EB1}$, at the point $B_1$. The vehicle-output control means 82 commands the switching control means 50, the step-variable shifting control means 54 and the engine-output control device 43, so as to obtain the target overall speed ratio γT* and the target intake air quantity $Q_{AIR}^*$ at the point $B_1$.

When the operating amount of the accelerator pedal 45 is increased, for example, the target engine output PE* is changed from a value on the solid line "a" to a value on the solid line "b", so that the operating point of the engine is moved from the point $B_1$, to the point $B_2$. The target intake air quantity $Q_{AIR}^*$ for obtaining the engine torque $T_{EB2}$, that is, the target engine output $P_E^*$, is determined on the basis of the engine speed $N_{EB2}$ which is determined by the vehicle speed V and the target overall speed ratio γT* of the transmission mechanism 10 determined by the vehicle-output control means 82. The vehicle-output control means 82 commands the switching control means 50, the step-variable shifting control means 54 and the engine-output control device 43, so as to obtain the target overall speed ratio γT* and the target intake air quantity $Q_{AIR}^*$ at the point $B_2$, so that the transmission mechanism 10 is shifted as a result of an increase in the operating amount of the accelerator pedal 45.

Referring to the flow chart of FIG. 14, there will be described a major control function of the electronic control device 40, that is, a control routine for controlling the shifting of the transmission mechanism 10. This control routine is repeatedly executed with an extremely short cycle time of about several milliseconds to about several tens of milliseconds, for example. FIGS. 15 and 1y are the time charts for explaining the control routine illustrated in the flow chart of FIG. 14. The time chart of FIG. 15 indicates the control operation when the transmission mechanism 10 is shifted while it is placed in the continuously-variable shifting state, and the time chart of FIG. 16 indicates the control operation when the transmission mechanism 10 is shifted while it is placed in the step-variable shifting state.

The control routine is initiated with step S1 ("step" being hereinafter omitted) corresponding to the vehicle-output control means 82, to determine whether the transmission mechanism 10 should be shifted. This determination is made on the basis of the vehicle state represented by the vehicle speed V and the output torque $T_{OUT}$ of the automatic transmission portion 20, and according to the shifting boundary line map (shifting control map) stored in the memory means 56, for example. At a point of time t1 in FIG. 15, a determination of a shifting action of the transmission mechanism 10 as indicated by arrow-headed line A in FIG. 6 is made. At a point of time t1 in FIG. 16, a determination of a shifting action of the transmission mechanism 10 as indicted by arrow-headed line B in FIG. 6 is made. If a negative decision is made in S1, controls of the transmission mechanism 10 other than the shifting control are implemented, or one cycle of the present control routine is terminated with the present vehicle state being maintained.

If an affirmative decision is made in S1, the control flow goes to S2 corresponding to the target-output calculating means 80 and the target-engine-output calculating means 81, to calculate (determine) the target vehicle output $P_W^*$ at the drive wheels 38, on the basis of the accelerator pedal operating amount $A_{CC}$, and further calculate (determine) the target engine output $P_E^*$ for obtaining the target vehicle output $P_W^*$. For instance, the target engine output $P_E^*$ is calculated on the basis of the actually calculated target vehicle output $P_W^*$ and according to a relationship between the target vehicle output $P_W^*$ and the target engine output $P_E^*$, which relationship is stored in the memory means 56 and which is obtained by experimentation so as to take account of the power transmission loss of the transmission mechanism 10 and the power loss due to the loads acting on the optionally provided devices such as the air conditioner.

The above-described S2 is followed by S3 corresponding to the switching control means, to determine whether the actual vehicle state represented by the vehicle speed V and the output torque $T_{OUT}$ is in the step-variable shifting region in which the vehicle is running in the step-variable shifting state of the transmission mechanism 10, or has changed into the step-variable shifting region, requiring the transmission mechanism 10 to be switched into the step-variable shifting state. This determination is made according to the switching boundary line map shown in FIG. 6, for example.

If an affirmative decision is obtained in S3, the control flow goes to S4 corresponding to the vehicle-output control means (step-variable-transmission speed-ratio determining means 86), to determine the target value γT* of the overall speed ratio γT* of the transmission mechanism 10 and the target intake air quantity $Q_{AIR}^*$ for establishing the operating point of the engine which provides the target engine output $P_E^*$ and which is located relatively close to the optimum fuel economy curve of FIG. 12. This determination is made on the basis of the actual vehicle speed V and the target engine output $P_E^*$ calculated in S2. Where the determined target overall speed ratio γT* is any one of the speed ratios of the first through fourth gear positions of the automatic transmission portion (step-variable transmission portion) 20, the above-indicated one speed ratio is determined as the target speed ratio γ* of the automatic transmission portion 20. Where the determined overall speed ratio γT* is the speed ratio of the fifth position of the automatic transmission portion 20, the speed ratio of the fourth gear position is determined as the target speed ratio γ* of the automatic transmission portion 20. The step-variable shifting control means 54 is commanded to control the automatic transmission portion 20 so as to establish the determined target speed ratio γ*. At the same time, the engine-output control device 43 is commanded to control the throttle valve opening angle $\theta_{TH}$ so as to coincide with the target value $\theta_{TH}*$ corresponding to the determined target intake air quantity $Q_{AIR}*$.

S5 corresponding to the vehicle-output control means 82 (continuously-variable-transmission speed-ratio determining means 84) is implemented substantially concurrently with the S4, namely, in synchronization with the S4, to determine the target speed ratio $\gamma 0*$ of the continuously-variable transmission portion 11 to be equal to 1, where the target overall speed ratio $\gamma T*$ is any one of the speed ratios of the first through fourth gear positions, or to be equal to about 0.7, where the target overall speed ratio $\gamma T*$ is the speed ratio of the fifth gear position. The switching control means 50 is commanded to control the continuously-variable transmission portion 11 such that the speed ratio $\gamma 0$ coincides with the determined target value $\gamma 0*$. According to the command received from the switching control means 50, the hydraulic control unit 42 is operated to engage the switching clutch C0 and release the switching brake B0, for thereby establishing the target speed ratio $\gamma 0*$ of 1, or release the switching clutch C0 and engage the switching brake B0, for thereby establishing the target speed ratio $\gamma 0*$ of about 0.7. The transmission mechanism 10 is commanded to effect a shifting action at a point of time t2 in FIG. 16.

Figure 16:
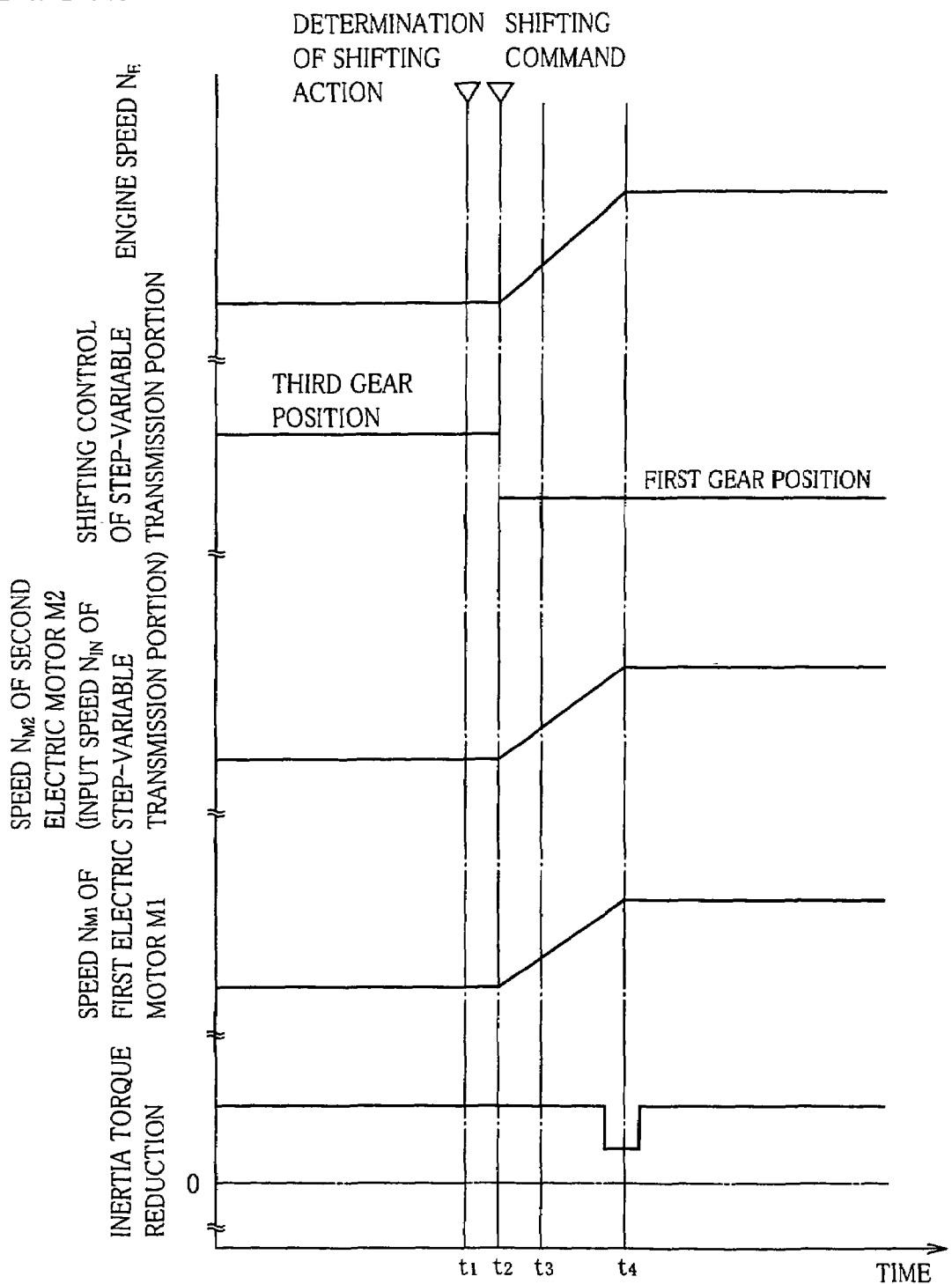
FIG. 16 is a time chart for explaining the control routine illustrated in the flow chart of FIG. 14, that is, a shifting action of the transmission mechanism which takes place while the transmission mechanism is placed in the step-variable shifting state.

During a time period from the point of time t2 to a point of time t4 indicated in FIG. 16, the input speed of the automatic transmission portion 20, that is, the rotating speed of the power transmitting member 18 (second electric motor speed $N_{M2}$) is raised as a result of a shift-down action of the automatic transmission portion 20, since the vehicle speed V is held constant. At this time, the continuously-variable transmission portion 11 is placed in the locked state with the switching clutch C0 held in the engaged state, so that the speed ratio $\gamma 0$ is held constant at 1, so that the engine speed $N_E$ and the first electric motor speed $N_{M1}$ are changed with the rotating speed of the power transmitting member 18. Thus, the engine speed $N_E$ is continuously changed. The shifting action with a change of the engine operating point from the point $B_1$ to the point $B_2$ indicated in FIG. 12 is illustrated in the example of FIG. 16. At a point around the point of time t4 in FIG. 16, that is, during a time period between points immediately before and after the moment of completion of the shifting action, a torque-reduction control is implemented to reduce or offset an inertia torque which is generated due to speed changes of the rotary members within the transmission mechanism 10 as a result of the shifting action.

For example, the torque-reduction control is implemented by an engine-torque-reduction control in which the engine torque $T_E$ is reduced by reducing the opening angle of the electronic throttle valve or the amount of fuel supply by the fuel injection device or retarding the timing of ignition of the engine 8 by the ignition device. In place of or in addition to the engine-torque-reduction control, a motor-torque-reduction control may be implemented by controlling the second electric motor speed NM2 to change toward the rotating speed of the power transmitting member 18 after completion of the shifting action, for thereby reducing the above-described inertia torque, or by controlling the second electric motor M2 to temporarily generate a reverse driving torque, or a regenerative braking torque while charging the electric-energy storage device 60, for thereby offsetting the inertia torque.

If a negative decision is obtained in S3, the control flow goes to S6 corresponding to the vehicle-output control means 82 (step-variable-transmission speed-ratio determining means 86), to determine the target value $\gamma T*$ of the overall speed ratio $\gamma T*$ of the transmission mechanism 10 within the range available, and the target intake air quantity $Q_{AIR}*$, for establishing the operating point of the engine which provides the target engine output $P_E*$ and which is located relatively close to the optimum fuel economy curve of FIG. 12. This determination is made on the basis of the actual vehicle speed V and the target engine output $P_E*$ calculated in S2. Further, the desired gear position (target speed ratio $\gamma*$) of the automatic transmission portion 20 is determined for establishing the operating point of the engine which provides the target engine output $P_E*$ and which is located relatively close to the optimum fuel-economy curve of FIG. 12. The step-variable shifting control means 54 is commanded to establish the determined gear position (target speed ratio $\gamma*$) of the automatic transmission 20.

S7 corresponding to the vehicle-output control means 82 (continuously-variable-transmission speed-ratio determining means 84) is implemented substantially concurrently with the S6, namely, in synchronization with the S6, to determine the target speed ratio $\gamma 0*$ of the continuously-variable transmission portion 11 for establishing the target overall speed ratio $\gamma T*$, on the basis of the target overall speed ratio $\gamma T*$, the target speed ratio $\gamma*$ of the automatic transmission portion 20, and the relationship between the target speed ratio $\gamma 0*$ and the target speed ratio $\gamma*$. The hybrid control means 52 is commanded to control the continuously-variable transmission portion 11 such that the speed ratio $\gamma 0$ coincides with the determined target value $\gamma 0*$. According to the command received from the hybrid control means 52, the first electric motor M1 is controlled such that the speed ratio $\gamma 0$ of the continuously-variable transmission portion 11 coincides with the target value $\gamma 0*$. At the same time, the engine-output control device 43 is commanded to control the throttle valve opening angle $\theta_{TH}$ so as to coincide with the target value $\theta_{TH}*$ corresponding to the target intake air quantity $Q_{AIR}*$. At the point of time t2 in FIG. 15, the transmission mechanism 10 is commanded to effect the shifting action.

During a time period from the point of time t2 to a point of time t4 indicated in FIG. 15, the input speed of the automatic transmission portion 20, that is, the rotating speed of the power transmitting member 18 (second electric motor speed $N_{M2}$) is raised as a result of a shift-down action of the automatic transmission portion 20, since the vehicle speed V is held constant. At this time, the speed ratio $\gamma 0$ of the continuously-variable transmission portion 11 is changed by controlling the first electric motor M1, so that the engine speed $N_E$ is changed with a change of the overall speed ratio T. Thus, the engine speed $N_E$ is continuously changed. The shifting action with a change of the engine operating point from the point $A_1$ to the point $A_2$ indicated in FIG. 12 is illustrated in the example of FIG. 15. At a point around the point of time t4 in FIG. 15, that is, during a time period between points immediately before and after the moment of completion of the shifting action, a torque-reduction control is implemented to reduce or offset an inertia torque which is generated due to speed changes of the rotary members within the transmission mechanism 10 as a result of the shifting action.

In the control device according to the above-described embodiment for the transmission mechanism 10 including the continuously-variable transmission portion 11 operable as an electrically controlled continuously variable transmission and an automatic transmission portion 20 functioning as an automatic transmission, the vehicle-output control means 82 determines the speed ratio $\gamma 0$ of the continuously-variable transmission portion 11 and the speed ratio $\gamma$ of the automatic transmission portion 20 on the basis of the target engine output $P_E*$ and the vehicle speed V, so as to establish the operating point of the engine 8 which provides the target engine output $P_E^*$ and which is located close to the stored optimum fuel-economy curve. Accordingly, the shifting control of the continuously-variable transmission portion 11 and the shifting control of the automatic transmission portion 20 can be adequately performed so as to adequately control the engine output $P_E$, during the shifting control of the transmission mechanism 10, whereby the fuel economy and the operating efficiency are improved.

Further, the shifting control of the continuously-variable transmission portion 11 and the shifting control of the automatic transmission portion 20 are substantially concurrently performed on the basis of the speed ratio γ0 of the continuously-variable transmission portion 11 and the speed ratio γ of the automatic transmission portion 20 which are determined by the vehicle-output control means 82, so that the engine speed $N_E$ is continuously changed, and the shifting shock is reduced.

Further, the speed ratio γ0 of the continuously-variable transmission portion 11 determined by the vehicle-output control means 82 is established by the first electric motor M1 and/or the second electric motor M2. In other words, the engine speed $N_E$ is changed by using the first electric motor M1 and/or the second electric motor M2, so that the shifting response of the continuously-variable transmission portion 11 is improved.

It is also noted that the transmission mechanism 10 (continuously-variable transmission portion 11) is switchable between the continuously-variable shifting state and the step-variable shifting state, and that the vehicle-output control means 82 determines the speed ratio γ0 of the continuously-variable transmission portion 11 and the speed ratio γ0 of the automatic transmission portion 20, in the different methods depending upon whether the transmission mechanism 10 is placed in the continuously-variable shifting state or the step-variable shifting state. In the step-variable shifting state in which the speed ratio γ0 of the continuously-variable transmission portion 11 is held constant and the engine speed $N_E$ is bound by the vehicle speed V, for instance, the engine-output control means 82 determines the speed ratio γ0 of the continuously-variable transmission portion 11 and the speed ratio γ of the automatic transmission portion 20, so as to establish the operating point of the engine 8 which provides the target engine output $P_E^*$ and which is located relatively close to the stored optimum fuel-economy curve. In the continuously-variable shifting state in which the speed ratio γ0 of the continuously-variable transmission portion 11 is changed by the first electric motor M1 and/or the second electric motor M2, that is, the engine is in a freely rotatable state in which the engine speed $N_E$ is not bound by the vehicle speed V, the vehicle-output control means 82 determines the speed ratio γ0 of the continuously-variable transmission portion 11 and the speed ratio γ of the automatic transmission portion 20, so as to establish the operating point of the engine 8 which provides the target engine output $P_E^*$ and which follows the stored optimum fuel-economy curve.

Embodiment 3

Figures 17, 18:
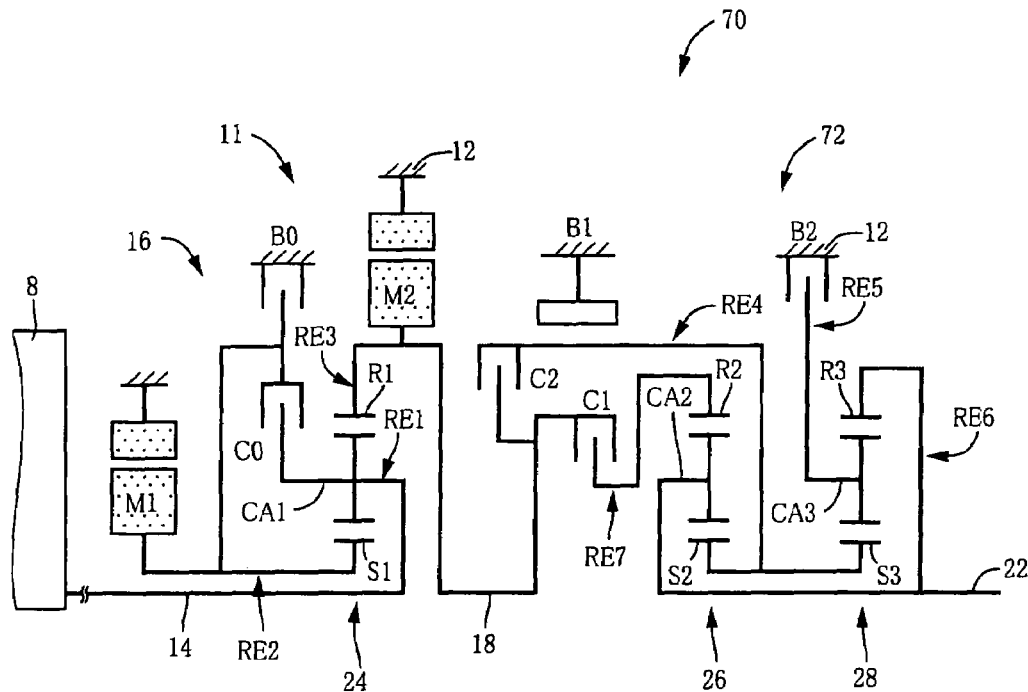
FIG. 17 is a schematic view corresponding to that of FIG. 1, showing an arrangement of a drive system for a hybrid vehicle, which is constructed according to another embodiment of the present invention.
FIG. 18 is a table corresponding to that of FIG. 2, indicating shifting actions of the hybrid vehicle drive system of the embodiment of FIG. 17, which is operable in a selected one of the continuously-variable shifting state and the step-variable shifting state, in relation to different combinations of the operating states of the hydraulically operated frictional coupling devices to effect the respective shifting actions.
Figure 19:
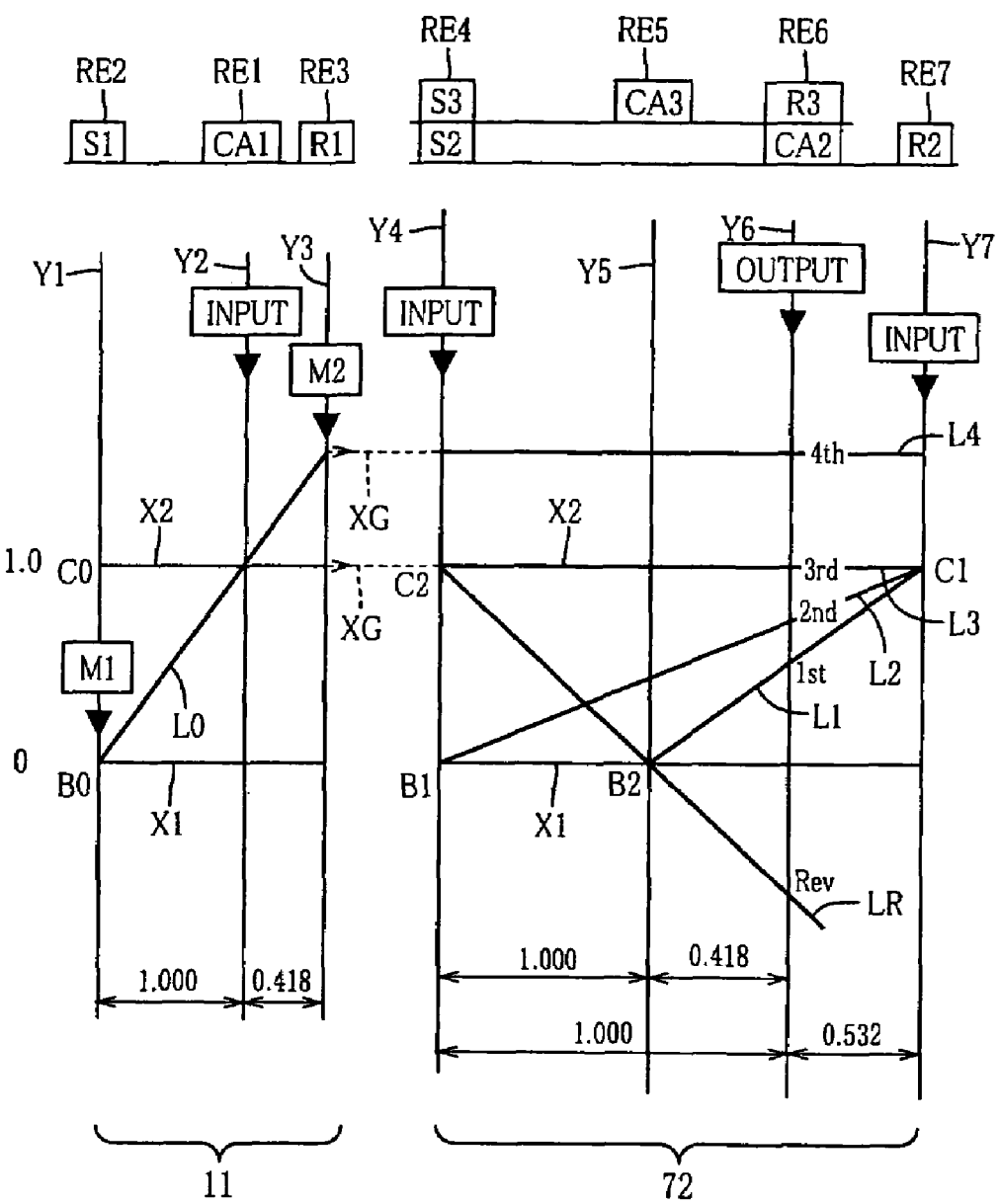
FIG. 19 is a collinear chart corresponding to that of FIG. 3, indicating relative rotating speeds of the rotary elements of the drive system of the hybrid vehicle drive system of the embodiment of FIG. 17 in the different gear positions of the drive system.

FIG. 17 is a schematic view showing an arrangement of a transmission mechanism 70 according to a further embodiment of the present invention, and FIG. 18 is a table indicating gear positions of the transmission mechanism 70, and different combinations of engaged states of the hydraulically operated frictional coupling devices for respectively establishing those gear positions, while FIG. 19 is a collinear chart for explaining a shifting operation of the transmission mechanism 70.

The transmission mechanism 70 includes the continuously-variable transmission portion 11 having the first electric motor M1, power distributing mechanism 16 and second electric motor M2, as in the first embodiment. The transmission mechanism 70 further includes an automatic transmission portion 72 having three forward drive positions. The automatic transmission portion 72 is disposed between the continuously-variable transmission portion 11 and the output shaft 22 and is connected in series to the continuously-variable transmission portion 11 and output shaft 22, through the power transmitting member 18. The power distributing mechanism 16 includes the first planetary gear set 24 of single-pinion type having a gear ratio ρ1 of about 0.418, for example, and the switching clutch C0 and the switching brake B0, as in the preceding embodiments. The automatic transmission portion 72 includes a single-pinion type second planetary gear set 26 having a gear ratio ρ2 of about 0.532, for example, and a single-pinion type third planetary gear set 28 having a gear ratio ρ3 of about 0.418, for example. The second sun gear S2 of the second planetary gear set 26 and the third sun gear S3 of the third planetary gear set 28 are integrally fixed to each other as a unit, selectively connected to the power transmitting member 18 through the second clutch C2, and selectively fixed to the transmission casing 12 through the first brake B1. The second carrier CA2 of the second planetary gear set 26 and the third ring gear R3 of the third planetary gear set 28 are integrally fixed to each other and fixed to the output shaft 22. The second ring gear R2 is selectively connected to the power transmitting member 18 through the first clutch C1, and the third carrier CA3 is selectively fixed to the transmission casing 12 through the second brake B2.

In the transmission mechanism 70 constructed as described above, one of a first gear position (first speed position) through a fourth gear position (fourth speed position), a reverse gear position (rear-drive position) and a neural position is selectively established by engaging actions of a corresponding combination of the frictional coupling devices selected from the above-described switching clutch C0, first clutch C1, second clutch C2, switching brake B0, first brake B1 and second brake B2, as indicated in the table of FIG. 18. Those gear positions have respective speed ratios γ (input shaft speed $N_{IN}$/output shaft speed $N_{OUT}$) which change as geometric series. In particular, it is noted that the power distributing mechanism 16 provided with the switching clutch C0 and brake B0 can be selectively placed by engagement of the switching clutch C0 or switching brake B0, in the fixed-speed-ratio shifting state in which the mechanism 16 is operable as a transmission having fixed speed ratio or ratios, as well as in the continuously-variable shifting state in which the mechanism 16 is operable as a continuously variable transmission described above. In the present transmission mechanism 70, therefore, a step-variable transmission is constituted by the automatic transmission portion 20, and the continuously-variable transmission portion 11 which is placed in the fixed-speed-ratio shifting state by engagement of the switching clutch C0 or switching brake B0. Further, a continuously variable transmission is constituted by the automatic transmission portion 20, and the continuously-variable transmission portion 11 which is placed in the continuously-variable shifting state, with none of the switching clutch C0 and brake B0 being engaged. In other words, the transmission mechanism 70 is switched to the step-variable shifting state, by engaging one of the switching clutch C0 and switching brake B0, and to the continuously-variable shifting state by releasing both of the switching clutch C0 and switching brake B0.

Where the transmission mechanism 70 functions as the step-variable transmission, for example, the first gear position having the highest speed ratio γ1 of about 2.804, for example, is established by engaging actions of the switching clutch C0, first clutch C1 and second brake B2, and the second gear position having the speed ratio γ2 of about 1.531, for example, which is lower than the speed ratio γ1, is established by engaging actions of the switching clutch C0, first clutch C1 and first brake B1, as indicated in FIG. 18. Further, the third gear position having the speed ratio γ3 of about 1.000, for example, which is lower than the speed ratio γ2, is established by engaging actions of the switching clutch C0, first clutch C1 and second clutch C2, and the fourth gear position having the speed ratio γ4 of about 0.705, for example, which is lower than the speed ratio γ3, is established by engaging actions of the first clutch C1, second clutch C2, and switching brake B0. Further, the reverse gear position having the speed ratio γR of about 2.393, for example, which is intermediate between the speed ratios γ1 and γ2, is established by engaging actions of the second clutch C2 and the second brake B2. The neutral position N is established by engaging only the switching clutch C0.

When the transmission mechanism 70 functions as the continuously-variable transmission, on the other hand, the switching clutch C0 and the switching brake B0 are both released, as shown in the table of FIG. 18, so that the continuously-variable transmission portion 11 functions as the continuously variable transmission, while the automatic transmission portion 72 connected in series to the continuously-variable transmission portion 11 functions as the step-variable transmission, whereby the speed of the rotary motion transmitted to the automatic transmission portion 72 placed in one of the first through third gear positions, namely, the rotating speed of the power transmitting member 18 is continuously changed, so that the speed ratio of the transmission mechanism 10 when the automatic transmission portion 72 is placed in one of those gear positions is continuously variable over a predetermined range. Accordingly, the speed ratio of the automatic transmission portion 72 is continuously variable across the adjacent gear positions, whereby the overall speed ratio γT of the transmission mechanism 70 is continuously variable.

The collinear chart of FIG. 19 indicates, by straight lines, a relationship among the rotating speeds of the rotary elements in each of the gear positions of the transmission mechanism 70, which is constituted by the continuously-variable transmission portion 11 functioning as the continuously-variable shifting portion or first shifting portion, and the automatic transmission portion 72 functioning as the step-variable shifting portion or second shifting portion. The collinear chart indicates the rotating speeds of the individual elements of the continuously-variable transmission portion 11 when the switching clutch C0 and brake B0 are both released, and the rotating speeds of those elements when the switching clutch C0 or brake B0 is engaged, as in the preceding embodiments In FIG. 19, four vertical lines Y4, Y5, Y6 and Y7 corresponding to the automatic transmission portion 72 respectively represent the relative rotating speeds of a fourth rotary element (fourth element) RE4 in the form of the second and third sun gears S2, S3 integrally fixed to each other, a fifth rotary element (fifth element) RE5 in the form of the third carrier CA3, a sixth rotary element (sixth element) RE6 in the form of the second carrier CA2 and third ring gear R3 that are integrally fixed to each other, and a seventh rotary element (seventh element) RE7 in the form of the second ring gear R2. In the automatic transmission portion 72, the fourth rotary element RE4 is selectively connected to the power transmitting member 18 through the second clutch C2, and is selectively fixed to the transmission casing 12 through the first brake B1, and the fifth rotary element RE5 is selectively fixed to the transmission casing 12 through the second brake B2. The sixth rotary element RE6 is fixed to the output shaft 22 of the automatic transmission portion 72, and the seventh rotary element RE7 is selectively connected to the power transmitting member 18 through the first clutch C1.

When the first clutch C1 and the second brake B2 are engaged, the automatic transmission portion 72 is placed in the first gear position. The rotating speed of the output shaft 22 in the first gear position is represented by a point of intersection between the vertical line Y6 indicative of the rotating speed of the sixth rotary element RE6 fixed to the output shaft 22 and an inclined straight line L1 which passes a point of intersection between the vertical line Y7 indicative of the rotating speed of the seventh rotary element RE7 (R2) and the horizontal line X2, and a point of intersection between the vertical line Y5 indicative of the rotating speed of the fifth rotary element RE5 (CA3) and the horizontal line X1, as indicated in FIG. 19. Similarly, the rotating speed of the output shaft 22 in the second gear position established by the engaging actions of the first clutch C1 and first brake B1 is represented by a point of intersection between an inclined straight line L2 determined by those engaging actions and the vertical line Y6 indicative of the rotating speed of the sixth rotary element RE6 (CA2, R3) fixed to the output shaft 22. The rotating speed of the output shaft 22 in the third speed position established by the engaging actions of the first clutch C1 and second clutch C2 is represented by a point of intersection between an inclined straight line L3 determined by those engaging actions and the vertical line Y6 indicative of the rotating speed of the sixth rotary element RE6 fixed to the output shaft 22. In the first through third gear positions in which the switching clutch C0 is placed in the engaged state, the seventh rotary element RE7 is rotated at the same speed as the engine speed $N_E$, with the drive force received from the continuously-variable transmission portion 11. When the switching clutch B0 is engaged in place of the switching clutch C0, the sixth rotary element RE6 is rotated at a speed higher than the engine speed $N_E$, with the drive force received from the continuously-variable transmission portion 11. The rotating speed of the output shaft 22 in the fourth gear position established by the engaging actions of the first clutch C1, second clutch C2 and switching brake B0 is represented by a point of intersection between a horizontal line L4 determined by those engaging actions and the vertical line Y6 indicative of the rotating speed of the sixth rotary element RE6 fixed to the output shaft 22.

The transmission mechanism 70 is also constituted by the continuously-variable transmission portion 11 functioning as the continuously-variable shifting portion or first shifting portion, and the automatic transmission portion 72 functioning as the step-variable shifting portion or second shifting portion, so that the present transmission mechanism 70 has advantages similar to those of the first embodiment.

Embodiment 4

Figure 20:
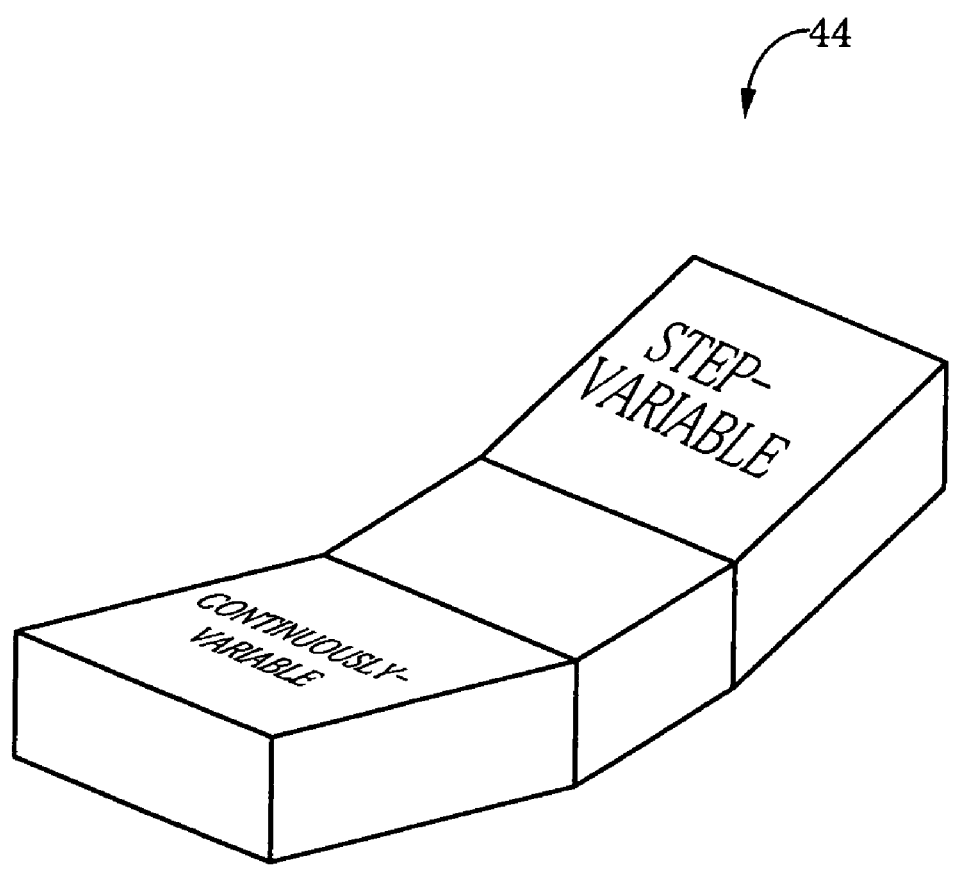
FIG. 20 is a view showing a manually operable shifting-state selecting device in the form of a seesaw switch functioning as a shifting device, the seesaw switch being operated by the user to select the shifting state of the drive system.

FIG. 20 shows an example of a seesaw switch 44 (hereinafter referred to as "switch 44") functioning as a shifting-state selecting device manually operable to select the differential state or the non-differential state (locked state) of the power distributing mechanism 16, that is, to select the continuously-variable shifting state or the step-variable shifting state of the power distributing mechanism 16. The switch 44 is provided on the vehicle such that the switch 44 is manually operable by the user, to select the desired shifting state during running of the vehicle. The switch 44 has a continuously-variable-shifting running pushbutton labeled "CONTINUOUSLY-VARIABLE", and a step-variable-shifting running pushbutton labeled "STEP-VARIABLE", as shown in FIG. 20, and is selectively placed in the continuously-variable shifting position (in which the transmission mechanism 10 is operable as the electrically controlled continuously variable transmission) by depressing the step-variable-shifting running pushbutton, and in the continuously-variable shifting position (in which the transmission mechanism 10 is operable as the step-variable transmission) by depressing the continuously-variable-shifting running pushbutton.

In the preceding embodiments, the shifting state of the transmission mechanism 10 is automatically switched on the basis of the detected vehicle condition and according to the switching boundary line map of FIG. 6. However, the shifting state of the transmission mechanism 10 may be manually switched by a manual operation of the switch 44. Namely, the switching control means 50 may be arranged to selectively place the transmission mechanism 10 in the continuously-variable shifting state or the step-variable shifting state, depending upon whether the switch 44 is placed in its continuously-variable shifting position or step-variable shifting position. For instance, the user of the vehicle manually operates the switch 44 to place the transmission mechanism 10 in the continuously-variable shifting state when the user likes the transmission mechanism 10 to operate as the continuously variable transmission or wants to improve the fuel economy of the engine, or alternatively in the step-variable shifting state when the user likes a change of the engine speed as a result of a shifting action of the step-variable transmission. Where the switch 44 has a neutral position, the switch 44 is placed in its neutral position when the user has not selected the desired shifting state or likes the transmission mechanism 10 to be automatically placed in one of the continuously-variable and step-variable shifting states.

While the embodiments of the present invention have been described above in detail by reference to the accompanying drawings, it is to be understood that the present invention may be otherwise embodied.

In the preceding embodiments, the target-output calculating means 80 calculates the target vehicle output in the form of the target vehicle output $P_W^*$ at the drive wheels 38, on the basis of the vehicle output required by the vehicle operator, in the form of the operating amount $A_{CC}$ of the accelerator pedal 45. However, the operator's required vehicle output is not limited to the operating amount of the accelerator pedal 45, and may be an amount of operation of any other manually operable member, which reflects the operator's required vehicle output. The manually operable member may be a lever-like rod member, a seesaw switch or a slide switch. Further, the accelerator pedal operating amount $A_{CC}$ used as the operator's required vehicle output may be replaced by the throttle valve opening angle $\theta_{TH}$, an amount of fuel injection into a chamber formed in the intake pipe of the engine 8 or into the cylinders of the engine 8, or the intake air quantity $Q_{AIR}$ which is a quantity of air drawn into the intake pipe. The target vehicle output need not be the target vehicle output $P_W^*$ at the drive wheels 38, but may be a target vehicle output at the output shaft 22, or a target vehicle output $P_{DEF}$ at the output rotary member of the differential gear device 36.

In the preceding embodiments, the vehicle-output control means 82 determines the target speed ratio $\gamma 0^*$ of the continuously-variable transmission portion 11 and the target speed ratio $\gamma^*$ (desired gear position) of the automatic transmission portion 20, for establishing the target engine output $P_E^*$, on the basis of the actual vehicle speed V and the target engine output $P_E^*$. Since the target engine output $P_E^*$ is calculated on the basis of the target vehicle output, which is calculated on the basis of the operator's required vehicle output, the vehicle-output control means 82 may determine the target speed ratio $\gamma 0^*$ of the continuously-variable transmission portion 11 and the target speed ratio $\gamma^*$ (desired gear position) of the automatic transmission portion 20 for obtaining the target engine output $P_E^*$, on the basis of the actual vehicle speed V and the target vehicle output, or on the basis of the actual vehicle speed V and the operator's required vehicle output.

The target-engine-output calculating means 81 in the preceding embodiments calculates the target engine output $P_E^*$ for obtaining the target vehicle output $P_W^*$, on the basis of the target vehicle output $P_W^*$. However, the target-engine-output calculating means 81 may calculate the target engine output PE* directly on the basis of the operator's required vehicle output. The target engine output $P_E^*$ may include an assisting torque produced by the first electric motor M1 and/or the second electric motor M2, that is, an electric motor output $P_M$. In this case, the intake air quantity $Q_{AIR}$ and the amounts of electric current $I_{M1}$, $I_{M2}$ applied to the electric motors M1, M2 are controlled so that the target engine output $P_E^*$ is provided by the engine output $P_E$ and the electric motor output $P_M$. In this connection, it is noted that when the engine is operating at a relatively low speed with a relatively small opening angle of the throttle valve, it is more efficient to operate the electric motor M1, M2 as the electric generator for charting the electric-energy storage device 60, than to control the vehicle output by controlling the first electric motor M1 and/or the second electric motor M2.

Figure 14:
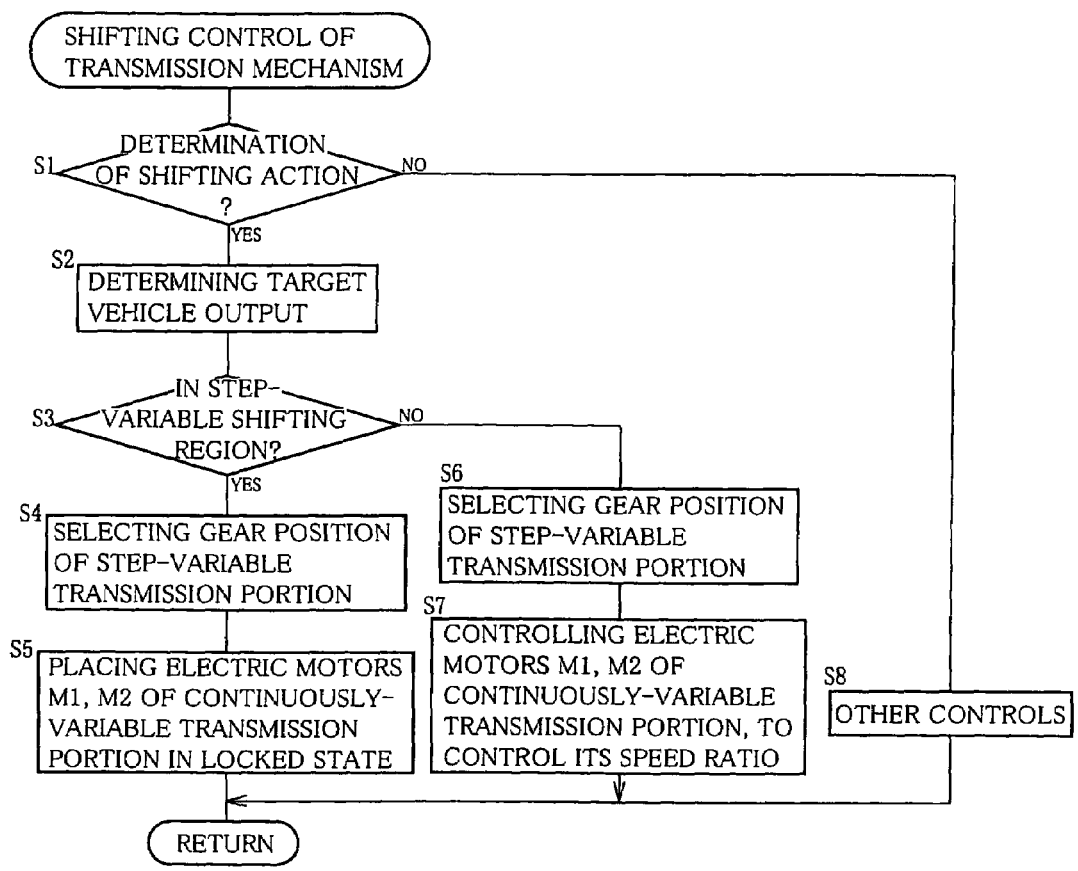
FIG. 14 is a flow chart illustrating a control routine executed by the electronic control device of FIG. 5 for controlling shifting actions of the transmission mechanism.
Figure 15:
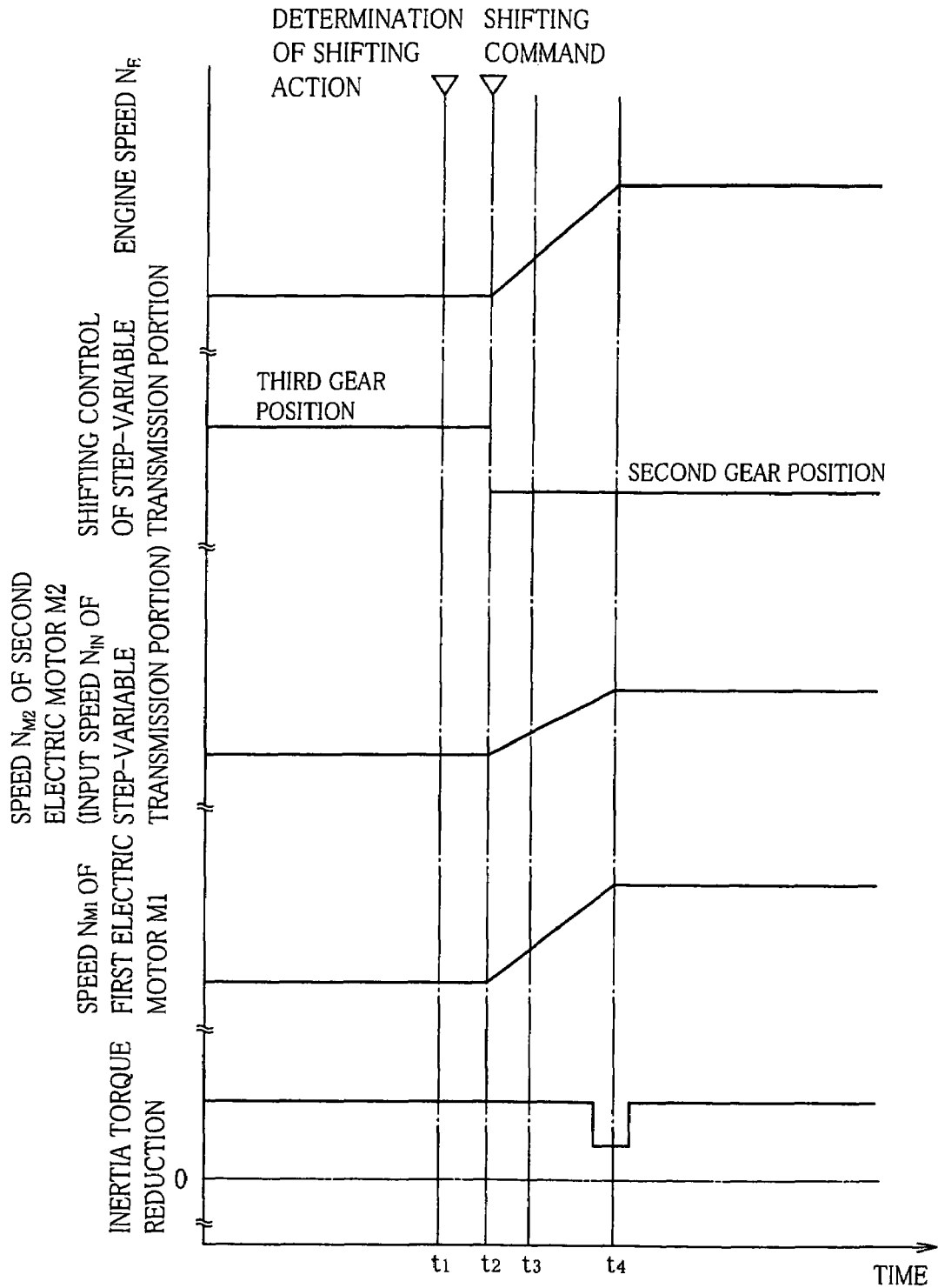
FIG. 15 is a time chart for explaining the control routine illustrated in the flow chart of FIG. 14, that is, a shifting action of the transmission mechanism which takes place while the transmission mechanism is placed in the continuously-variable shifting state.

The continuously-variable transmission portion 11 may be commanded to effect a shifting action on the basis of the target engine output $P_E^*$, even in the absence of the determination of the shifting action according to the flow chart of FIG. 14 in the preceding embodiment.

In step S3 of the flow chart of FIG. 14 in the preceding embodiment, the determination as to whether the vehicle is running in the step-variable shifting state or not is made on the basis of the actual vehicle state represented by the vehicle speed V and the output torque $T_{OUT}$ and according to the switching boundary line map shown in FIG. 6. However, this determination may be based on the selected operating state of the switch 44.

In the illustrated embodiments, the continuously-variable transmission portion 11 is placed selectively in its continuously-variable shifting state or in its fixed-speed-ratio shifting state, to place the transmission mechanism 10, 70 selectively in one of the continuously-variable shifting state in which the continuously-variable transmission portion 11 functions as the electrically controlled continuously variable transmission, and the step-variable shifting state in which the continuously-variable transmission portion 11 functions as the step-variable transmission. However, the principle of the present invention is applicable to a transmission mechanism which cannot be switched to the step-variable shifting state, namely, to a transmission mechanism the continuously-variable transmission portion 11 of which is not provided with the switching clutch C0 and switching brake B0 and functions only as the electrically controlled continuously variable transmission (electrically controlled differential device).

In the illustrated embodiments, the transmission mechanism 10, 70 is placed selectively in one of the continuously-variable and step-variable shifting states, when the continuously-variable transmission portion 11 (power distributing portion 16) is placed selectively in its differential state in which the continuously-variable transmission portion 11 is operable as the electrically controlled continuously variable transmission, and in its non-differential state (locked state) in which the continuously-variable transmission portion 11 is not operable as the electrically controlled continuously variable transmission. However, the transmission mechanism 10, 70 may function as the step-variable transmission while the speed ratio of the continuously-variable transmission portion 11 is variable in steps rather than continuously, while this transmission portion 11 remains in the differential state. In other words, the differential and non-differential states of the continuously-variable transmission portion 11 need not respectively correspond to the continuously-variable and step-variable shifting states of the transmission mechanism 10, 70, and the continuously-variable transmission portion 11 need not be switchable between the continuously-variable and step-variable shifting states. The principle of the present invention is applicable to any transmission mechanism (its continuously-variable transmission portion 11 or power distributing mechanism 16) which is switchable between the differential state and the non-differential state.

In the power distributing mechanism 16 in the illustrated embodiments, the first carrier CA1 is fixed to the engine 8, and the first sun gear S1 is fixed to the first electric motor M1 while the first ring gear R1 is fixed to the power transmitting member 18. However, this arrangement is not essential. The engine 8, first electric motor M1 and power transmitting member 18 may be fixed to any other elements selected from the three elements CA1, S1 and R1 of the first planetary gear set 24.

While the engine 8 is directly fixed to the input shaft 14 in the illustrated embodiments, the engine 8 may be operatively connected to the input shaft 14 through any suitable member such as gears and a belt, and need not be disposed coaxially with the input shaft 14.

In the illustrated embodiments, the first electric motor M1 and the second electric motor M2 are disposed coaxially with the input shaft 14, and are fixed to the first sun gear S1 and the power transmitting member 18, respectively. However, this arrangement is not essential. For example, the first and second electric motors M1, M2 may be operatively connected to the first sun gear S1 and the power transmitting member 18, respectively, through gears or belts.

Although the power distributing mechanism 16 in the illustrated embodiments is provided with the switching clutch C0 and the switching brake B0, the power distributing mechanism 16 need not be provided with both of the switching clutch C0 and brake B0. While the switching clutch C0 is provided to selectively connect the first sun gear S1 and the first carrier CA1 to each other, the switching clutch C0 may be provided to selectively connect the first sun gear S1 and the first ring gear R1 to each other, or selectively connect the first carrier CA1 and the first ring gear R1. Namely, the switching clutch C0 may be arranged to connect any two elements of the three elements of the first planetary gear set 24.

While the switching clutch C0 is engaged to establish the neutral position N in the transmission mechanism 10, 70 in the illustrated embodiments, the switching clutch C0 need not be engaged to establish the neutral position.

The hydraulically operated frictional coupling devices used as the switching clutch C0, switching brake B0, etc. in the illustrated embodiments may be replaced by a coupling device of a magnetic-power type, an electromagnetic type or a mechanical type, such as a powder clutch (magnetic powder clutch), an electromagnetic clutch and a meshing type dog clutch.

In the illustrated embodiments, the second electric motor M2 is fixed to the power transmitting member 18. However, the second electric motor M2 may be fixed to the output shaft 22 or to a rotary member of the automatic transmission portion 20, 72.

In the illustrated embodiments, the automatic transmission portion 20, 72 is disposed in the power transmitting path between the drive wheels 38, and the power transmitting member 18 which is the output member of the continuously-variable transmission portion 11 or power distributing mechanism 16. However, the automatic transmission portion 20, 72 may be replaced by any other type of power transmitting device such as a continuously variable transmission (CVT), which is a kind of an automatic transmission. Where the continuously variable transmission (CVT) is provided, the transmission mechanism as a whole is placed in the step-variable shifting state when the power distributing mechanism 16 is placed in the fixed-speed-ratio shifting state. The fixed-speed-ratio shifting state is defined as a state in which power is transmitted primarily through a mechanical power transmitting path, without power transmission through an electric path. The continuously variable transmission may be arranged to establish a plurality of predetermined fixed speed ratios corresponding to those of the gear positions of the automatic transmission portion 20, 72, under the control of a step-variable shifting control portion which stores data indicative of the predetermined speed ratios.

While the automatic transmission portion 20, 72 is connected in series to the continuously-variable transmission portion 11 through the power transmitting member 18 in the illustrated embodiments, the automatic transmission portion 20, 72 may be mounted on and disposed coaxially with a counter shaft which is parallel to the input shaft 14. In this case, the continuously-variable transmission portion 11 and the automatic transmission portion 20, 72 are operatively connected to each other through a suitable power transmitting device or a set of two power transmitting members such as a pair of counter gears, and a combination of a sprocket wheel and a chain.

The power distributing mechanism 16 provided as a differential mechanism in the illustrated embodiments may be replaced by a differential gear device including a pinion rotated by the engine 8, and a pair of bevel gears which are respectively operatively connected to the first and second electric motors M1, M2.

Although the power distributing mechanism 16 is constituted by one planetary gear set in the illustrated embodiments, the power distributing mechanism 16 may be constituted by two or more planetary gear sets and arranged to be operable as a transmission having three or more gear positions when placed in its non-differential state (fixed-speed-ratio shifting state).

In the illustrated embodiments, the manually operable shifting device 46 is provided with the shift lever 48 manually operable to select one of a plurality of operating positions. However, the shift lever 48 may be replaced by pushbutton switches, a slide-type or any other type of switch manually operable to select a desired one of a plurality of operating positions, or by devices not operated by hand, such as a device operated in response to a voice of the vehicle operator or operated by foot, to select one of a plurality of operating positions. Although the shift lever 48 has the manual forward-drive position M for selecting the number of the forward-drive gear positions available for automatic shifting of the automatic transmission portion 20, 72, the shift lever 48 placed in the manual forward-drive position M may be used to manually shift up or down the automatic transmission portion 20, 72, within the range from the first gear position through the fourth gear position, by operating the shift lever 48 from the position M to the shift-up position "+" or shift-down position "−".

While the switch 44 is of a seesaw type switch in the preceding embodiment, the switch 44 may be replaced by a single pushbutton switch, two pushbutton switches that are selectively pressed into operated positions, a lever type switch, a slide-type switch or any other type of switch or switching device that is operable to select a desired one of the continuously-variable shifting state (differential state) and the step-variable shifting state (non-differential state). Where the switch 44 does not have a neutral position, an additional switch may be provided to enable and disable the switch 44. A device not operated by hand but operated in response to a voice of the vehicle operator or operated by foot may be provided in place of, or in addition to the switch 44, to select one of the continuously-variable shifting state (differential state) and the step-variable shifting state (non-differential state).

The fuel-economy map of FIG. 12 in the illustrated embodiments is formulated in principle on the basis of the specifications of the engine 8, but is influenced by the state of the vehicle, for example, by internal and external factors of the engine 8. That is, the fuel-economy map is affected by the internal and external factors such as the cooling water temperature, catalyst temperature, and combustion state represented by the air/fuel ratio, more specifically, a lean-burn state or stoichiometric state, for example. Accordingly, the memory means 56 may store a plurality of fuel-economy maps, or the stored fuel-economy map may be updated in a real-time fashion on the basis of the internal and external factors described above. The vehicle-output control means 82 may be arranged to select one of the stored plurality of fuel-economy maps on the basis of the above-described internal and eternal factors.

While the embodiments of the present invention have been described for illustrative purpose only, it is to be understood that the present invention may be embodied with various changes and improvements which may occur to those skilled in the art.

What is claimed is:

1. A control device for a vehicular drive system including a continuously-variable transmission portion operable as an electrically controlled continuously variable transmission and having a differential mechanism operable to distribute an output of an engine to a first electric motor and a power transmitting member, and a second electric motor disposed in a power transmitting path between said power transmitting member and a drive wheel of a vehicle, and further including an automatic transmission portion which constitutes a part of said power transmitting path and which functions as an automatic transmission, said control device comprising:

vehicle-output control means for determining an overall speed ratio including a speed ratio of said continuously-variable transmission portion and a speed ratio of said automatic transmission portion, on the basis of a target output power of the vehicle and a running speed of the vehicle, so as to establish an operating point of said engine which provides a target output of the engine.

2. The control device according to claim 1, wherein a shifting control of said continuously-variable transmission portion and a shifting control of said automatic transmission portion are effected substantially concurrently, on the basis of the speed ratio of said continuously-variable transmission portion and the speed ratio of said automatic transmission portion which have been determined by said vehicle-output control means.

3. The control device according to claim 1, wherein the speed ratio of the continuously-variable transmission portion determined by said vehicle-output control means is established by using at least one of said first electric motor and said second electric motor.

4. The control device according to claim 1, further comprising target-output calculating means for calculating said target output power of the vehicle on the basis of an output of the vehicle required by an operator of the vehicle and according to a stored relationship between said target output of the vehicle and said output of the vehicle required by the operator, and target-engine-output calculating means for calculating said target output of the engine on the basis of said target output of the vehicle, and wherein said vehicle-output control means determines the speed ratio of said continuously-variable transmission portion and the speed ratio of said automatic transmission portion on the basis of the target output of the engine and the running speed of the vehicle, so as to establish the operating point of the engine which provides said target output of the engine and which is located close to a stored optimum fuel-economy curve of the engine.

5. The control device according to claim 1, wherein said differential mechanism includes a differential-state switching device operable to place the differential mechanism selectively into a continuously-variable shifting state in which the continuously-variable transmission portion is operable as an electrically controlled continuously variable transmission, and a step-variable shifting state in which the continuously-variable transmission portion is not operable as the electrically controlled transmission.

6. The control device according to claim 5, wherein said differential mechanism includes a first element fixed to said engine, a second element fixed to said first electric motor, and a third element fixed to said power transmitting member, and said differential-state switching device is operable to permit said first, second and third elements to be rotated relative to each other, for thereby placing the differential mechanism in said continuously-variable shifting state, and to connect the first, second and third elements for rotation as a unit or to hold the second element stationary, for thereby placing the differential mechanism in said step-variable shifting state.

7. The control device according to claim 6, wherein said differential-state switching device includes at least one of a clutch operable to connect the first, second and third elements to each other for rotation of the first, second and third elements as a unit, and a brake operable to fix the second element to a stationary member for holding the second element stationary.

8. The control device according to claim 5, wherein said vehicle-output control means determines the speed ratio of said continuously-variable transmission portion and the speed ratio of said automatic transmission portion, in different methods depending upon whether the continuously-variable transmission portion is placed in said continuously-variable shifting state or said step-variable shifting state.

9. A control device for a vehicular drive system including a continuously-variable transmission portion operable as an electrically controlled continuously variable transmission and having a differential mechanism operable to distribute an output of an engine to a first electric motor and a power transmitting member, and a second electric motor disposed in a power transmitting path between said power transmitting member and a drive wheel of a vehicle, and further including an automatic transmission portion which constitutes a part of said power transmitting path and which functions as an automatic transmission, said control device being characterized by comprising:

vehicle-output control means for determining a speed ratio of said continuously-variable transmission portion and a speed ratio of said automatic transmission portion, on the basis of a target output of said engine and a running speed of the vehicle, so as to establish an operating point of the engine which provides said target output of the engine.

10. The control device according to claim 9, wherein a shifting control of said continuously-variable transmission portion and a shifting control of said automatic transmission portion are effected substantially concurrently, on the basis of the speed ratio of said continuously-variable transmission portion and the speed ratio of said automatic transmission portion which have been determined by said vehicle-output control means.

11. The control device according to claim 9, wherein the speed ratio of the continuously-variable transmission portion determined by said vehicle-output control means is established by using said first electric motor and/or said second electric motor.

12. The control device according to 9, further comprising target-output calculating means for calculating a target output power of the vehicle on the basis of an output of the vehicle required by an operator of the vehicle and according to a stored relationship between said target output power of the vehicle and said output of the vehicle required by the operator, and target-engine-output calculating means for calculating said target output of the engine on the basis of said target output of the vehicle, and wherein said vehicle-output control means determines the speed ratio of said continuously-variable transmission portion and the speed ratio of said automatic transmission portion on the basis of the target output of the engine and the running speed of the vehicle, so as to establish the operating point of the engine which provides said target output of the engine and which is located close to a stored optimum fuel-economy curve of the engine.

13. The control device according to claim 9, wherein said differential mechanism includes a differential-state switching device operable to place the differential mechanism selectively into a continuously-variable shifting state in which the continuously-variable transmission portion is operable as an electrically controlled continuously variable transmission, and a step-variable shifting state in which the continuously-variable transmission portion is not operable as the electrically controlled transmission.

14. The control device according to claim 13, wherein said differential mechanism includes a first element fixed to said engine, a second element fixed to said fist electric motor, and a third element fixed to said power transmitting member, and said differential-state switching device is operable to permit said first, second and third elements to be rotated relative to each other, for thereby placing the differential mechanism in said continuously-variable shifting state, and to connect the first, second and third elements for rotation as a unit or to hold the second element stationary, for thereby placing the differential mechanism in said step-variable shifting state.

15. The control device according to claim 14, wherein said differential-state switching device includes at least one of a clutch operable to connect the first, second and third elements to each other for rotation of the first, second and third elements as a unit, and a brake operable to fix the second element to a stationary member for holding the second element stationary.

16. The control device according to claim 13, wherein said vehicle-output control means determines the speed ratio of said continuously-variable transmission portion and the speed ratio of said automatic transmission portion, in different methods depending upon whether the continuously-variable transmission portion is placed in said continuously-variable shifting state or said step-variable shifting state.

17. A control device for a vehicular drive system including a continuously-variable transmission portion operable as an electrically controlled continuously variable transmission and having a differential mechanism operable to distribute an output of an engine to a first electric motor and a power transmitting member, and a second electric motor disposed in a power transmitting path between said power transmitting member and a drive wheel of a vehicle, and further including an automatic transmission portion which constitutes a part of said power transmitting path and which functions as an automatic transmission, said control device being characterized by comprising:

vehicle-output control means for determining a speed ratio of said continuously-variable transmission portion and a speed ratio of said automatic transmission portion, on the basis of a desired output of the vehicle required by an operator of the vehicle and a running speed of the vehicle, so as to establish an operating point of said engine which provides a target output of the engine.

18. The control device according to claim 17, wherein a shifting control of said continuously-variable transmission portion and a shifting control of said automatic transmission portion are effected substantially concurrently, on the basis of the speed ratio of said continuously-variable transmission portion and the speed ratio of said automatic transmission portion which have been determined by said vehicle-output control means.

19. The control device according to claim 17, wherein the speed ratio of the continuously-variable transmission portion determined by said vehicle-output control means is established by using at least one of said first electric motor and said second electric motor.

20. The control device according to 17, further comprising target-output calculating means for calculating a target output power of the vehicle on the basis of said output of the vehicle required by the operator of the vehicle and according to a stored relationship between said target output power of the vehicle and said output of the vehicle required by the operator, and target-engine-output calculating means for calculating said target output of the engine on the basis of said target output of the vehicle, and wherein said vehicle-output control means determines the speed ratio of said continuously-variable transmission portion and the speed ratio of said automatic transmission portion on the basis of the target output of the engine and the running speed of the vehicle, so as to establish the operating point of the engine which provides said target output of the engine and which is located close to a stored optimum fuel-economy curve of the engine.

21. The control device according to claim 17, wherein said differential mechanism includes a differential-state switching device operable to place the differential mechanism selectively into a continuously-variable shifting state in which the continuously-variable transmission portion is operable as an electrically controlled continuously variable transmission, and a step-variable shifting state in which the continuously-variable transmission portion is not operable as the electrically controlled transmission.

22. The control device according to claim 21, wherein said differential mechanism includes a first element fixed to said engine, a second element fixed to said fist electric motor, and a third element fixed to said power transmitting member, and said differential-state switching device is operable to permit said first, second and third elements to be rotated relative to each other, for thereby placing the differential mechanism in said continuously-variable shifting state, and to connect the first, second and third elements for rotation as a unit or to hold the second element stationary, for thereby placing the differential mechanism in said step-variable shifting state.

23. The control device according to claim 22, wherein said differential-state switching device includes at least one of a clutch operable to connect the first, second and third elements to each other for rotation of the first, second and third elements as a unit, and a brake operable to fix the second element to a stationary member for holding the second element stationary.

24. The control device according to claim 21, wherein said vehicle-output control means determines the speed ratio of said continuously-variable transmission portion and the speed ratio of said automatic transmission portion, in different methods depending upon whether the continuously-variable transmission portion is placed in said continuously-variable shifting state or said step-variable shifting state.

* * * * *

UNITED STATES PATENT AND TRADEMARK OFFICE
CERTIFICATE OF CORRECTION

PATENT NO. : 7,534,190 B2
APPLICATION NO. : 11/322250
DATED : May 19, 2009
INVENTOR(S) : Tabata et al.

It is certified that error appears in the above-identified patent and that said Letters Patent is hereby corrected as shown below:

On the title page, Item (73), the Assignee's information is incorrect. Item (73) should read:

-- (73)  Assignee:  Toyota Jidosha Kabushiki Kaisha,
Toyota-shi (JP) --

Signed and Sealed this

Fourteenth Day of July, 2009

JOHN DOLL
*Acting Director of the United States Patent and Trademark Office*